US009642105B2

(12) United States Patent
Patel et al.

(10) Patent No.: US 9,642,105 B2
(45) Date of Patent: May 2, 2017

(54) ACCESS TERMINAL-ASSISTED TIME AND/OR FREQUENCY TRACKING

(75) Inventors: Chirag Sureshbhai Patel, San Diego, CA (US); Mehmet Yavuz, San Diego, CA (US); Vansh Pal Singh Makh, San Diego, CA (US); Luca Blessent, Bridgewater, NJ (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 12/947,022

(22) Filed: Nov. 16, 2010

(65) Prior Publication Data

US 2011/0281574 A1 Nov. 17, 2011

Related U.S. Application Data

(60) Provisional application No. 61/262,091, filed on Nov. 17, 2009, provisional application No. 61/299,837, filed on Jan. 29, 2010.

(51) Int. Cl.
*H04J 3/06* (2006.01)
*H04W 56/00* (2009.01)

(52) U.S. Cl.
CPC ............... *H04W 56/0015* (2013.01)

(58) Field of Classification Search
USPC ............... 370/229, 230, 252, 310, 315, 351; 455/3.01, 400, 403, 7, 26, 1, 73
See application file for complete search history.

(56) References Cited

U.S. PATENT DOCUMENTS

| 5,872,774 A | 2/1999 | Wheatley, III |
| 5,898,929 A | 4/1999 | Haartsen |
| 6,151,311 A * | 11/2000 | Wheatley et al. ............ 370/335 |
| 6,307,840 B1 | 10/2001 | Wheatley, III |

(Continued)

FOREIGN PATENT DOCUMENTS

| CN | 1398079 A | 2/2003 |
| CN | 1875648 A | 12/2006 |

(Continued)

OTHER PUBLICATIONS

U.S. Appl. No. 61/094,100, filed Sep. 2008, Han et al.*

(Continued)

*Primary Examiner* — Kibrom T Hailu
(74) *Attorney, Agent, or Firm* — Ashish L. Patel

(57) ABSTRACT

An access point (e.g., a femto cell) that is connected in an active call with an access terminal may cooperate with that access terminal or another access terminal to derive timing information from one or more neighboring access points (e.g., macro access points). In addition, an access point may cooperate with an idle access terminal to derive timing information from one or more neighboring access points. For example, an access terminal may determine the difference between pilot transmission timing or frame transmission timing of a femto cell and a macro cell, and report this timing difference to the femto cell. Based on this timing difference, the femto cell may adjust the timing and/or frequency of its transmissions so that these transmissions are synchronized in time and/or frequency as per network operation requirements.

59 Claims, 21 Drawing Sheets

(56) References Cited

U.S. PATENT DOCUMENTS

| | | |
|---|---|---|
| 6,433,739 B1 | 8/2002 | Soliman |
| 6,590,881 B1 | 7/2003 | Wallace et al. |
| 6,847,630 B2 | 1/2005 | Blanz et al. |
| 6,970,708 B1 | 11/2005 | Raith |
| 6,983,031 B2 | 1/2006 | Wheatley |
| 7,295,531 B2 | 11/2007 | Wheatley et al. |
| 7,391,759 B2 | 6/2008 | Wallace et al. |
| 7,512,111 B2 | 3/2009 | Kauhanen |
| 7,929,970 B1 | 4/2011 | Gunasekara et al. |
| 8,226,340 B1 | 7/2012 | Mahalingam |
| 8,244,257 B2 | 8/2012 | Walldeen et al. |
| 8,249,189 B2 | 8/2012 | Aoki et al. |
| 8,355,713 B1 | 1/2013 | Oh et al. |
| 8,391,252 B2 * | 3/2013 | Yang ............ H04W 52/0216 370/336 |
| 2003/0114204 A1 | 6/2003 | Allen et al. |
| 2003/0123666 A1 | 7/2003 | Sambhwani et al. |
| 2003/0194992 A1 | 10/2003 | Kim et al. |
| 2004/0043746 A1 | 3/2004 | Hiramatsu |
| 2005/0058097 A1 | 3/2005 | Kang et al. |
| 2005/0094589 A1 | 5/2005 | Camp et al. |
| 2005/0099972 A1 | 5/2005 | Motegi et al. |
| 2005/0130672 A1 | 6/2005 | Dean et al. |
| 2005/0186933 A1 | 8/2005 | Trans |
| 2006/0293067 A1 | 12/2006 | Leung et al. |
| 2007/0053340 A1 * | 3/2007 | Guilford ............ 370/350 |
| 2007/0093268 A1 | 4/2007 | Hosono et al. |
| 2007/0230393 A1 | 10/2007 | Sinha et al. |
| 2007/0254620 A1 | 11/2007 | Lindqvist et al. |
| 2007/0286136 A1 | 12/2007 | Rittle et al. |
| 2008/0002660 A1 | 1/2008 | Jeong et al. |
| 2008/0176568 A1 | 7/2008 | Palanki et al. |
| 2008/0181195 A1 | 7/2008 | Cho et al. |
| 2008/0188266 A1 | 8/2008 | Carter et al. |
| 2008/0254812 A1 | 10/2008 | Kitazoe |
| 2008/0261596 A1 | 10/2008 | Khetawat et al. |
| 2008/0268856 A1 | 10/2008 | Francalanci et al. |
| 2008/0285529 A1 | 11/2008 | Kwak et al. |
| 2008/0285539 A1 | 11/2008 | Tiedemann, Jr. et al. |
| 2008/0311926 A1 | 12/2008 | Fischer et al. |
| 2009/0067417 A1 | 3/2009 | Kalavade et al. |
| 2009/0086691 A1 | 4/2009 | Balasubramanian |
| 2009/0092122 A1 * | 4/2009 | Czaja ............ H04L 7/041 370/350 |
| 2009/0097452 A1 | 4/2009 | Gogic |
| 2009/0131049 A1 | 5/2009 | Osborn |
| 2009/0163216 A1 | 6/2009 | Hoang et al. |
| 2009/0164547 A1 | 6/2009 | Ch'ng et al. |
| 2009/0185632 A1 | 7/2009 | Cai et al. |
| 2009/0196266 A1 | 8/2009 | Wu et al. |
| 2009/0210888 A1 | 8/2009 | Lee et al. |
| 2009/0219888 A1 | 9/2009 | Chen et al. |
| 2009/0221303 A1 | 9/2009 | Soliman |
| 2009/0247084 A1 | 10/2009 | Palanki |
| 2009/0253421 A1 | 10/2009 | Camp, Jr. et al. |
| 2009/0258672 A1 | 10/2009 | Camp, Jr. et al. |
| 2009/0290555 A1 | 11/2009 | Alpert et al. |
| 2009/0316591 A1 | 12/2009 | Reial et al. |
| 2009/0316654 A1 | 12/2009 | Prakash et al. |
| 2010/0027694 A1 | 2/2010 | Touboul et al. |
| 2010/0035601 A1 | 2/2010 | Chen et al. |
| 2010/0035629 A1 | 2/2010 | Soliman |
| 2010/0041364 A1 | 2/2010 | Lott et al. |
| 2010/0046494 A1 | 2/2010 | Palanki et al. |
| 2010/0054237 A1 * | 3/2010 | Han et al. ............ 370/350 |
| 2010/0061356 A1 | 3/2010 | Qvarfordt et al. |
| 2010/0067433 A1 | 3/2010 | Cheng et al. |
| 2010/0067507 A1 | 3/2010 | Park |
| 2010/0085913 A1 | 4/2010 | Subrahmanya |
| 2010/0105377 A1 | 4/2010 | Iwamura et al. |
| 2010/0111070 A1 | 5/2010 | Hsu |
| 2010/0135248 A1 | 6/2010 | Aramaki et al. |
| 2010/0136997 A1 | 6/2010 | Palanki et al. |
| 2010/0141400 A1 | 6/2010 | Radulescu et al. |
| 2010/0150109 A1 | 6/2010 | Bradley et al. |
| 2010/0157906 A1 * | 6/2010 | Yang et al. ............ 370/328 |
| 2010/0173630 A1 | 7/2010 | Han et al. |
| 2010/0197309 A1 | 8/2010 | Fang et al. |
| 2010/0203891 A1 | 8/2010 | Nagaraja et al. |
| 2010/0210239 A1 | 8/2010 | Karaoguz et al. |
| 2010/0222068 A1 | 9/2010 | Gaal et al. |
| 2010/0242103 A1 | 9/2010 | Richardson et al. |
| 2010/0260168 A1 | 10/2010 | Gheorghiu et al. |
| 2011/0002284 A1 | 1/2011 | Talwar et al. |
| 2011/0019604 A1 | 1/2011 | Chun et al. |
| 2011/0058503 A1 | 3/2011 | Ono |
| 2011/0059739 A1 | 3/2011 | Huang |
| 2011/0098042 A1 | 4/2011 | Mach et al. |
| 2011/0128916 A1 | 6/2011 | Kwon et al. |
| 2011/0158164 A1 | 6/2011 | Palanki et al. |
| 2011/0182252 A1 | 7/2011 | Liu et al. |
| 2011/0275402 A1 | 11/2011 | Charipadi et al. |
| 2011/0281571 A1 | 11/2011 | Patel et al. |
| 2011/0300870 A1 | 12/2011 | Chun et al. |
| 2011/0312317 A1 | 12/2011 | Sahin et al. |
| 2012/0040659 A1 | 2/2012 | Iwamura et al. |
| 2012/0044908 A1 | 2/2012 | Spinelli et al. |
| 2012/0046025 A1 | 2/2012 | Das et al. |
| 2012/0046026 A1 | 2/2012 | Chande et al. |
| 2012/0046063 A1 | 2/2012 | Chande et al. |
| 2012/0052793 A1 | 3/2012 | Brisebois et al. |
| 2012/0052855 A1 | 3/2012 | Soliman et al. |
| 2012/0069800 A1 | 3/2012 | Soliman et al. |
| 2012/0094663 A1 | 4/2012 | Awoniyi et al. |
| 2012/0115496 A1 | 5/2012 | Soliman et al. |
| 2012/0142392 A1 | 6/2012 | Patel et al. |
| 2012/0178482 A1 | 7/2012 | Seo et al. |
| 2012/0184206 A1 | 7/2012 | Kim et al. |
| 2013/0005326 A1 | 1/2013 | Flanagan |
| 2013/0059592 A1 | 3/2013 | Chakraborty et al. |
| 2013/0095789 A1 | 4/2013 | Keevill et al. |
| 2013/0294425 A1 | 11/2013 | Song et al. |
| 2014/0134997 A1 | 5/2014 | Song et al. |

FOREIGN PATENT DOCUMENTS

| | | |
|---|---|---|
| CN | 101155167 A | 4/2008 |
| EP | 1089499 A2 | 4/2001 |
| EP | 1809056 A2 | 7/2007 |
| EP | 1871035 A1 | 12/2007 |
| GB | 2446192 | 8/2008 |
| JP | 6334593 A | 12/1994 |
| JP | 2002505542 A | 2/2002 |
| JP | 2004112225 A | 4/2004 |
| JP | 2005184824 A | 7/2005 |
| JP | 2007534221 A | 11/2007 |
| JP | 2007536788 A | 12/2007 |
| JP | 2008172380 A | 7/2008 |
| JP | 4352281 B1 | 10/2009 |
| JP | 2009232434 A | 10/2009 |
| JP | 2009239568 A | 10/2009 |
| JP | 2010041537 A | 2/2010 |
| JP | 2010512054 A | 4/2010 |
| JP | 2010166163 A | 7/2010 |
| JP | 2013511903 A | 4/2013 |
| KR | 20100034579 A | 4/2010 |
| WO | 9809390 A1 | 3/1998 |
| WO | 9937037 | 7/1999 |
| WO | 9944306 A1 | 9/1999 |
| WO | 03043229 A1 | 5/2003 |
| WO | 2005048628 A1 | 5/2005 |
| WO | 2005109767 A1 | 11/2005 |
| WO | 2008066957 A2 | 6/2008 |
| WO | 2008094334 A1 | 8/2008 |
| WO | 2008139707 A1 | 11/2008 |
| WO | 2008140225 A1 | 11/2008 |
| WO | WO2009006041 A1 | 1/2009 |
| WO | 2010017226 A2 | 2/2010 |
| WO | 2010022371 | 2/2010 |

(56) References Cited

FOREIGN PATENT DOCUMENTS

| WO | 2010033413 | 3/2010 |
|---|---|---|
| WO | 2010033438 | 3/2010 |
| WO | WO2011011760 A2 | 1/2011 |

OTHER PUBLICATIONS

International Search Report and Written Opinion—PCT/US2010/057107—ISA/EPO—Feb. 18, 2011.
3rd Generation Partnership Project, Technical Specification Group Radio Access Networks, Home Node B Radio Frequency (RF) Requirements (FDD) (Release 9), 3GPP Standard, 3GPP TR 25.967, 3rd Generation Partnership Project (3GPP), Mobile Competence Centre, 650, Route Des Lucioles, F-06921 Sophia-Antipolis Cedex, France, No. 9.0.0, May 1, 2009 (May 1, 2009), pp. 1-55, XP050369580, paragraph [0007].
Qualcomm Europe et al., "TDD HeNB Synchronization Requirement for Large Propagation Distance Case", 3GPP Draft, R4-094985, 3rd Generation Partnership Project (3GPP), Mobile Competence Centre, 650, Route Des Lucioles, F-06921 Sophia-Antipolis Cedex, France, no. Jeju, Nov. 9, 2009, Nov. 9, 2009 (Nov. 9, 2009), XP050394434, [retrieved on Nov. 17, 2009].
Qualcomm Europe: "HeNB Timing Requirements", 3GPP Draft, R4-091902 Timing Requirements, 3rd Generation Partnership Project (3GPP), Mobile Competence Centre, 650, Route Des Lucioles, F-06921 Sophia-Antipolis Cedex, France, no. San Francisco, Apr. 27, 2009, Apr. 27, 2009 (Apr. 27, 2009), XP050342629, [retrieved on Apr. 27, 2009] paragraph [0002].
Qualcomm Europe: "Synchronization Requirements and Techniques", 3GPP Draft, R4-091336, 3rd Generation Partnership Project (3GPP), Mobile Competence Centre, 650, Route Des Lucioles, F-06921 Sophia-Antipolis Cedex, France, no. Seoul, Korea, Mar. 19, 2009, Mar. 19, 2009 (Mar. 19, 2009), XP050342103, [retrieved on Mar. 19, 2009].
Qualcomm Europe: "Text Proposal on TDD HeNB Synchronization Requirement", 3GPP Draft, R4-093725 Text Proposal for HeNB Sync Requirements, 3rd Generation Partnership Project (3GPP), Mobile Competence Centre, 650, Route Des Lucioles, F-06921 Sophia-Antipolis Cedex, France, no. Miyazaki, Oct. 12, 2009, Oct. 12, 2009 (Oct. 12, 2009), XP050393326, [retrieved on Oct. 6, 2009].
Universal Mobile Telecommunications Systems (UMTS), Physical layer, Measurements (TDD) (3GPP TS 25.225 version 8.2.0 Release 8), ETSI TS 125 225, ETSI Standard, European Telecommunications Standards Institute (ETSI), Sophia Antipolis Cedex, France, vol. 3-R1, No. V8.2.0, Mar. 1, 2009 (Mar. 1, 2009), XP014043978, paragraph [0007].
3GPP TR 36.922 version 9.0.0 Release 9; LTE; Evolved Universal Terrestrial Radio Access (E-UTRA);TDD Home eNode B (HeNB) Radio Frequency (RF) requirements analysis, ETSI TR 136 922 V9.0.0, pp. 1-77, Apr. 2010.

"3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 9)", 3GPP Standard; 3GPP TR 36.922, 3rd Generation Partnership Project (3GPP), Mobile Competence Centre ; 650, Route Des Lucioles ; F-06921 Sophia-Antipolis Cedex ; France, No. V9.1.0, Jun. 21, 2010 (Jun. 21, 2010), pp. 1-74, XP050441979, [retrieved on Jun. 21, 2010].
LG Electronics: "Methods to facilitate the inter-cell coordination in heterogeneous networks", 3GPP Draft; R1-105358 CoordinatiOn_Method, 3rd Generation Partnership Project (3GPP), Mobile Competence Centre ; 650, Route Des Lucioles ; F-06921 Sophia-Antipolis Cedex ; France, vol. RAN WG1, no. Xi'an; Oct. 11, 2010, Oct. 5, 2010 (Oct. 5, 2010), XP050450509, [retrieved on Oct. 5, 2010].
Mediatek Inc: "Further Discussion on HeNB Downlink Power Setting in HetNet", 3GPP Draft; R1-105238 Power Setting in Hetnet, 3rd Generation Partnership Project (3GPP), Mobile Competence Centre ; 650, Route Des Lucioles ; F-06921 S0phia-Antipolis Cedex ; France, vol. RAN WG1, no. Xi'an; Oct. 11, 2010, Oct. 5, 2010 (Oct. 5, 2010), XP050450424, [retrieved on Oct. 5, 2010].
Mitsubishi Electric: "Dynamic Setup of HNBs for Energy Savings and Interference Reduction", 3GPP Draft; R3-081949 (Dynamic Setup HNBs), 3rd Generation Partnership Project (3GPP), Mobile Competence Centre ; 650, Route Des Lucioles ; F-06921 Sophia-Antipolis Cedex ; France, vol . RAN WG3, no. Jeju Island; Aug. 13, 2008, Aug. 13, 2008 (Aug. 13, 2008), XP050165010, [retrieved on Aug. 13, 2008].
Damnjanovic A., et al., "A Survey on 3GPP Heterogeneous Networks", IEEE Wireless Communications, IEEE Service Center, Piscataway, NJ, US, vol. 18, No. 3, Jun. 1, 2011 (Jun. 1, 2011), pp. 10-21, XP011367614, ISSN: 1536-1284, DOI: 10.1109/MWC.2011.5876496.
Domenico A.D., et al., "A Survey on MAC Strategies for Cognitive Radio Networks", IEEE Communications Surveys, IEEE, New York, NY, US, vol. 14, No. 1, Jan. 1, 2012 (Jan. 1, 2012), pp. 21-44, XP011420410, ISSN: 1553-877X, DOI: 10.1109/SURV.2011.111510.00108.
Motorola: "PCID confusion", R2-092307, 3GPP TSG RAN WG2 #65bis Mar. 23-27, 2009, Seoul, Korea, pp. 1-3.
Qualcomm Europe: "Network support for inbound handover of pre-Rel-9 UMTS UEs", R3-091213, 3GPP TSG RAN WG 3 #64, May 4-8, 2009 San Francisco, USA, pp. 1-3.
Taiwan Search Report—TW099139553—TIPO—Jun. 10, 2013.
Yavuz M., et al.,"Interference management and performance analysis of UMTS/HSPA+ femtocells", IEEE Communications Magazine, IEEE Service Center, Piscataway, US, vol. 47, No. 9, Sep. 1, 2009 (Sep. 1, 2009), pp. 102-109, XP011283371, ISSN: 0163-6804, Doi: 10.1109/MCOM.2009.5277462.

* cited by examiner

ACCESS TERMINAL-ASSISTED TIME AND/OR FREQUENCY TRACKING

CLAIM OF PRIORITY

This application claims the benefit of and priority to commonly owned U.S. Provisional Patent Application No. 61/262,091, filed Nov. 17, 2009, and U.S. Provisional Patent Application No. 61/299,837, filed Jan. 29, 2010, the disclosure of each of which is hereby incorporated by reference herein.

CROSS-REFERENCE TO RELATED APPLICATION

This application is related to concurrently filed and commonly owned U.S. patent application Ser. No. 12/947,039, entitled "IDLE ACCESS TERMINAL-ASSISTED TIME AND/OR FREQUENCY TRACKING," the disclosure of which is hereby incorporated by reference herein.

BACKGROUND

Field

This application relates generally to wireless communication and more specifically, but not exclusively, to time tracking and/or frequency tracking.

Introduction

A wireless communication network may be deployed over a geographical area to provide various types of services (e.g., voice, data, multimedia services, etc.) to users within that geographical area. In a typical implementation, macro access points (e.g., each of which provides service via one or more macro cells) are distributed throughout a macro network to provide wireless connectivity for access terminals (e.g., cell phones) that are operating within the geographical area served by the macro network.

As the demand for high-rate and multimedia data services rapidly grows, there lies a challenge to implement efficient and robust communication systems with enhanced performance. To supplement conventional network access points (e.g., to provide extended network coverage), small-coverage access points (e.g., low power access points) may be deployed to provide more robust indoor wireless coverage or other coverage to access terminals inside homes, enterprise locations (e.g., offices), or other locations. Such small-coverage access points may be referred to as, for example, femto cells, femto access points, home NodeBs, home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

Typically, femto cells transmit their signals with a certain time and frequency accuracy as mandated by the relevant air interface specification. For example, in cdma2000 systems, all access points (base stations) are required to be synchronized to the "system time." This "system time" is synchronous to coordinated universal time (UTC) (except for leap seconds) and uses the same time of origin as global positioning system (GPS) time, within some small error.

Time and frequency synchronization amongst different access points of the network is required for several purposes including, for example, controlling inter-access point interference (which would otherwise arise if different access points transmitted with widely different frequencies), and ensuring successful hand-off of an access terminal (mobile station) from one access point to another. If a femto cell is able to track the timing of nearby macro cells, the femto cell may coordinate its beacon transmissions with the wake-up time of the access terminals that are camped on the macro cell. This allows efficient femto cell idle-mode discovery and reduces the interference that would otherwise be induced at macro access terminals as a result of the femto cell beacon transmissions.

Current techniques used by femto cells for time and frequency tracking include deriving timing from a GPS receiver, deriving timing from a central accurate clock using Internet Protocol (IP) techniques such as IEEE1588, deriving timing from terrestrial TV broadcasts, and sniffing signals from neighboring macro access points. However, these techniques have several drawbacks. For example, a GPS receiver is not ideal for a low-cost consumer device such as a femto cell. Furthermore, a GPS signal may not be available in typical femto cell deployment scenarios such as inside buildings, basements, warehouses, etc. To avoid some of the drawbacks inherent to the use of GPS-based timing, a femto cell may instead rely on neighboring macro access points for time and frequency synchronization. In this case, a femto cell sniffs a neighboring macro access point's forward link (FL) transmissions (e.g., using a special module known as Network Listen Module) and uses the FL waveform structure as well as messages sent by the macro access point to derive timing and frequency information. However, to sniff neighboring macro access points that are transmitting in the same frequency band/channel as the femto cell, the femto cell transmitter is shut down so that femto cell forward link (FL) transmission do not interfere with the ability of the femto cell to receive macro access point FL transmissions. Therefore, such a Network Listen Module-based time and frequency tracking technique is used only when there is no user currently being serviced by the femto cell (e.g., there is no active voice/data session on-going on the femto cell) on the carrier frequency (and potentially adjacent carrier frequencies) to be sniffed by the Network Listen Module. In view of the above, there is a need for more efficient and reliable mechanisms for providing time and frequency synchronization for access points.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to access terminal-assisted time and frequency tracking for access points. For example, an access point (e.g., a femto cell) may cooperate with one or more access terminals to derive timing information from one or more neighboring access points (e.g., macro access points).

In some aspects, the derivation of this timing information may involve an access terminal determining the difference between the pilot transmission timing or the frame transmission timing of the access point and a neighboring access point. The access terminal reports this timing difference to the access point and the access point adjusts the timing and/or frequency of its transmissions based on this timing difference. As a result, these transmissions will track the timing of transmissions by the neighboring access point (e.g., synchronize the phase of the access point's transmissions to the phase of the neighboring access point's transmissions) and/or track a designated frequency (e.g., synchronize to the transmit frequency used by the neighboring access point in a case where the access points use the same carrier frequency, or synchronize to a frequency specified by network operation requirements in a case where the access points do not use the same carrier frequency). In some implementations, the neighboring access point may be synchronized to "system time" (e.g., through the use of GPS-based timing). Consequently, by tracking the neighboring access point, the access point may synchronize to "system time" and thereby meet network timing requirements. In addition to meeting timing requirements, by tracking the neighboring access point, the access point may also synchronize its frequency to and thereby meet network frequency synchronization requirements. In other implementations, the neighboring access point may not have its timing synchronized to other access points of the network, but will have only its frequency synchronized to these other access point. In these implementations, by tracking the frequency of a neighboring access point, the access point may synchronize its frequency to the frequency used by the other access points in the network.

Another use case of time tracking in accordance with the teachings herein is to align access point (e.g., femto cell) beacon transmissions or other transmissions to events that are based on the timing of a timing source (e.g., a neighboring macro cell). For example, idle reselection beacon transmissions of an access point (e.g., a femto cell) may be aligned with the wake-up time of an access terminal on a neighboring access point (e.g., a macro access terminal that is idling on a macro cell). The access terminal wake-up time is derived from the timing of the neighboring access point (e.g., the macro cell timing). Thus, by synchronizing its timing to the neighboring access point, the access point (e.g., the femto cell) may transmit beacons during an access terminal's expected wake-up times.

In some aspects, such an access terminal-assisted time and frequency tracking scheme may be advantageously employed when other time and frequency tracking methods are not available. For example, the disclosed tracking scheme does not require access point transmissions to be shut down to acquire timing information. Consequently, this tracking scheme may be employed when an access point is handling an active call (e.g., when a dedicated channel is established between the access point and an access terminal).

The disclosure thus relates in some aspects to a time and/or frequency tracking scheme where an access point that is connected in an active call with an access terminal cooperates with that access terminal or another access terminal to derive timing information from at least one other access point. In some aspects, such a scheme may involve determining that an access point is handling an active call, acquiring timing information from an access terminal during the active call as a result of the determination that the access point is handling the active call, and adjusting a clock that controls transmissions by the access point, wherein the adjustment of the clock is based on the acquired timing information.

The disclosure also relates in some aspects to a time and/or frequency tracking scheme where an access point cooperates with at least one nearby idle access terminal to derive timing information from at least one other access point. Here, an access point may receive timing information from, for example, an idle access terminal that is camping on the access point (e.g., listening to the access point's paging channel and other overhead channel transmissions) or from an access terminal that supports other states where observed time difference (OTD) or other suitable timing information is reported. In some aspects, such a scheme may involve determining that an access terminal is in idle mode at an access point, acquiring timing information from the access terminal as a result of the determination that the access terminal is in idle mode, and adjusting a clock that controls transmissions by the access point, wherein the adjustment of the clock is based on the acquired timing information.

BRIEF DESCRIPTION OF THE DRAWINGS

These and other sample aspects of the disclosure will be described in the detailed description and the appended claims that follow, and in the accompanying drawings, wherein:

Figure 1:
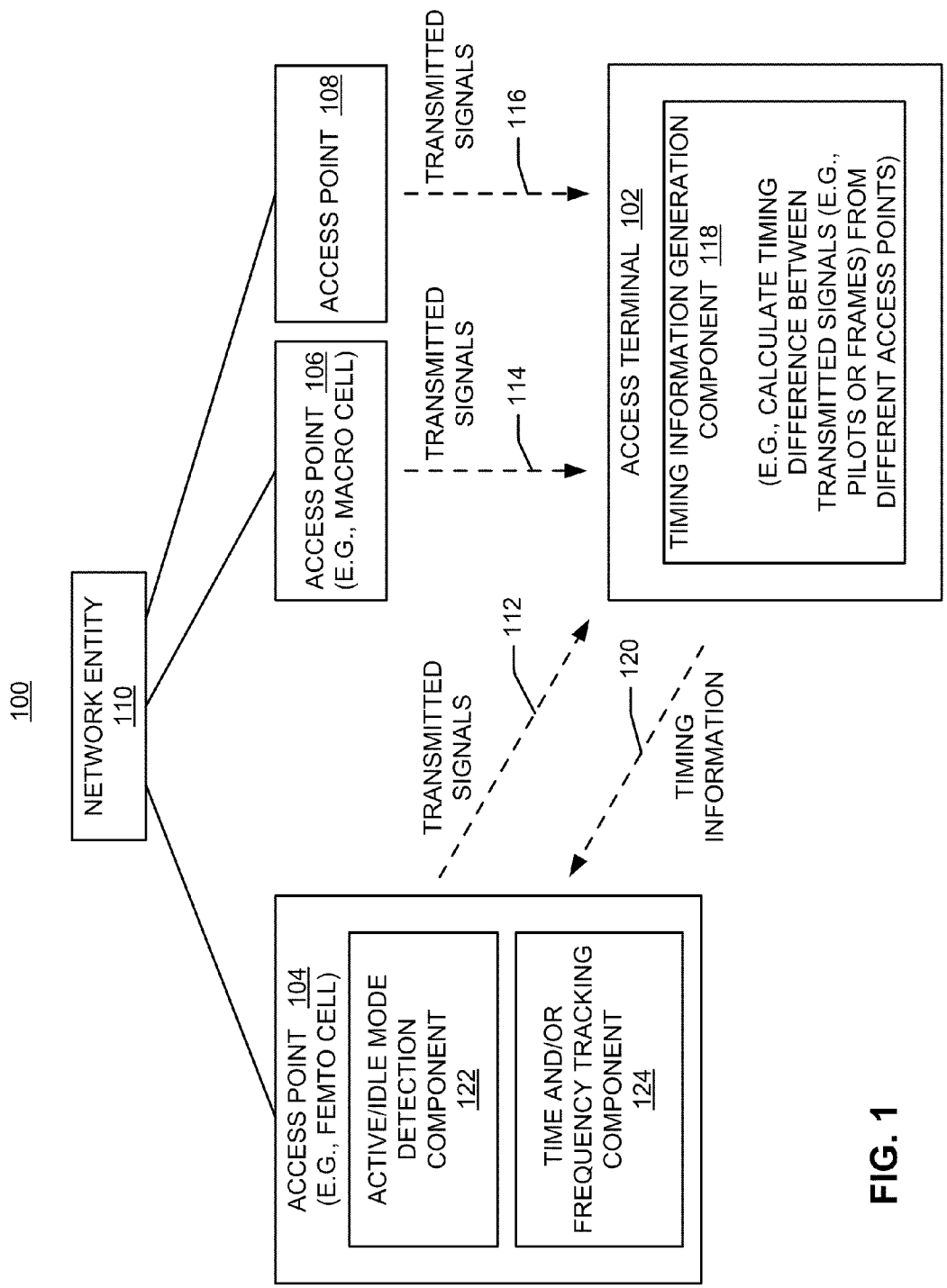
FIG. 1 is a simplified block diagram of several sample aspects of a communication system where an access point employs access terminal-assisted time tracking and/or and frequency tracking.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, femto cells, and so on, while access terminals may be referred to or implemented as user equipment, mobile stations, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, an access point 108, or some access point in the system 100 (not shown). Each of these access points may communicate with one or more network entities (represented, for convenience, by a network entity 110) to facilitate wide area network connectivity.

These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. Also, two of more of these network entities may be co-located and/or two or more of these network entities may be distributed throughout a network.

Access points in the system 100 employ internal timing mechanisms to control the timing and carrier frequency of wireless transmission and reception. For example, by transmitting and receiving at specified times on a specified frequency (or frequencies), an access point may be able to more efficiently communicate with other wireless entities (e.g., access terminals) in the network and may be able to reduce the interference that the access point's transmission may otherwise cause at other wireless entities (e.g., at access terminals connected to other access points). As mentioned above, one technique for facilitating efficient communication and mitigating interference involves requiring access points to be synchronized to the "system time" in a network. In such a case, access points may transmit their respective signals at specified timing offsets from a known "system time" (e.g., time T0). In addition, access points should also transmit on specified carrier frequencies to avoid interfering with transmission of other access points. An error in transmit frequency can also interfere with transmissions on neighboring carrier frequencies.

Consequently, signals transmitted by such access points may provide an indication of the internal timing used by each access point. For example, an access point may transmit a pilot signal sequence beginning at a specified timing offset from time T0. Similarly, an access point may transmit a frame beginning at a specified timing offset from time T0. In the example of FIG. 1, the access point 104, the access point 106, the access point 108 may transmit signals (e.g., pilots and/or frames) that provide an indication of the internal timing used by each access point as represented by the dashed arrows 112, 114, and 116, respectively.

The access point 104 (e.g., a femto cell employing a relatively low cost timing source) includes the capability to use access terminal-assisted time tracking and/or frequency tracking Such an access terminal-assisted tracking scheme may be employed when the access point 104 is servicing an active call and/or when the access point 104 detects an idle access terminal.

For example, when the access point 104 is not servicing an active call, the access point 104 may employ a Network Listen Module (not shown) that receives signals 114 and 116 from nearby access points 106 and 108 that have highly accurate timing (e.g., GPS-based) timing. Based on the timing information provided by these signals, the access point 104 synchronizes its timing (e.g., adjusts the phase and/or frequency of an internal clock) with the timing of the access points 106 and 108. When the access point 104 is handling an active call, however, the access point 104 may switch to access terminal-assisted time tracking and/or frequency tracking To this end, the access point 104 includes an active/idle mode detection component 122 that detects when the access point is handling an active call and invokes a switch to the access terminal-assisted tracking scheme. Upon switching to this tracking scheme, the access point 104 may then cooperate with the access terminal involved in the active call or some other nearby access terminal to acquire timing information indicative of the timing of nearby access points.

For the situation where an access terminal is idling on the access point 104, the active/idle mode detection component 122 may detect the presence of the nearby idle access terminal by, for example, sending a message to the access terminal requesting the access terminal to re-register at the access point 104 or requesting the access terminal to respond to a control channel message sent by the access point 104. Upon receiving a registration message or response from the access terminal, the access point 104 may then cooperate with the access terminal to acquire timing information indicative of the timing of nearby access points.

In either the active call situation or the idle access terminal situation, an access terminal 102 in the vicinity of the access points 104, 106, and 108 may receive the signals 112, 114, and 116 from these access points and generate timing information based on the these signals. For example, a timing information generation component 118 may calculate the timing difference between the times at which the signals 112 and 114 are received at the access terminal. Alternatively, or in addition, the timing information generation component 118 may calculate the timing difference between the times at which the signals 112 and 116 are received at the access terminal. After generating this timing information, the access terminal 102 sends the timing information to the access point 104 as represented by the dashed arrow 120. This timing information is sent in response to a request (or requests) by the access point 104 or may be sent when certain other events (e.g., channel quality of transmission from one or more access points falls below or exceeds some threshold).

A time and/or frequency tracking component 124 of the access point 104 uses this timing difference information to determine how far off the timing (and/or frequency) of the access point 104 is from the timing (and/or frequency) of another access point (e.g., access point 106 and/or access point 108). For example, based on the acquired timing information, the time and/or frequency tracking component 124 may determine the time difference (e.g., in chips, fractions of chips, etc.) between the T0 being used by the access point 104 and the T0 being used by the access point 106. The time and/or frequency tracking component 124 then adjusts its internal timing reference (e.g., adjusts the phase and/or frequency of an internal clock) to track the timing (and/or frequency) of the access point 106 based on this time difference.

As another example, access point beacon transmissions or other transmissions may be aligned to events that are based on the timing of a timing source. In this case, the timing information received from the access terminal 102 is indicative of the timing of an event at the access terminal 102. For example, idle reselection beacon transmissions of the access point 104 may be aligned with the wake-up time of the access terminal 102. This wake-up time may be derived from the timing of, for example, the access point 106 (e.g., when the access terminal 102 is idling on the access point 106). Thus, by synchronizing its timing to the neighboring access point, the access point (e.g., the femto cell) may transmit beacons during an access terminal's expected wake-up times. Thus, in some aspects, the timing information received from the access terminal 102 is indicative of timing of another access point (e.g., the access point 106) or a timing source, which drives timing of an event at the access terminal 102; and the adjustment of the clock comprises adjusting timing of a signal transmission by the access point 104 so that the adjusted timing is synchronized with the timing of the event.

Various techniques may be employed to facilitate efficient and effective access terminal-assisted tracking operations in accordance with the teachings herein. For example, as described below, an access point may adjust its internal clock based on timing information associated with one or more timing sources (e.g., access points) received from one or more access terminals. To this end, the access point may send messages to one or more access terminals requesting timing information from specified timing sources, requesting that the access terminals acquire the timing information from one or more specified carrier frequencies (e.g., the same carrier frequency used by the access point and/or at least one other carrier frequency). Also, the access point may determine whether to use timing information associated with a particular timing source based on the accuracy of that timing source and/or the signal quality of this access point as reported by the access terminal along with timing information. For example, if an access terminal reports timing information for two macro cells, the access point may elect to use the timing information associated with the macro cell with the strongest received signal strength (as measured and reported by the access terminal via a PSMM, RUM, etc.).

These and other access terminal-assisted tracking operations will be described in more detail in conjunction with the flowcharts of FIGS. 2-4, 6, and 8-14. For convenience, the operations of FIGS. 2-4, 6, and 8-14 (or any other operations discussed or taught herein) may be described as being performed by specific components (e.g., the components of FIG. 1 and FIG. 14). It should be appreciated, however, that these operations may be performed by other types of components and may be performed using a different number of components. It also should be appreciated that one or more of the operations described herein may not be employed in a given implementation.

Figure 2:
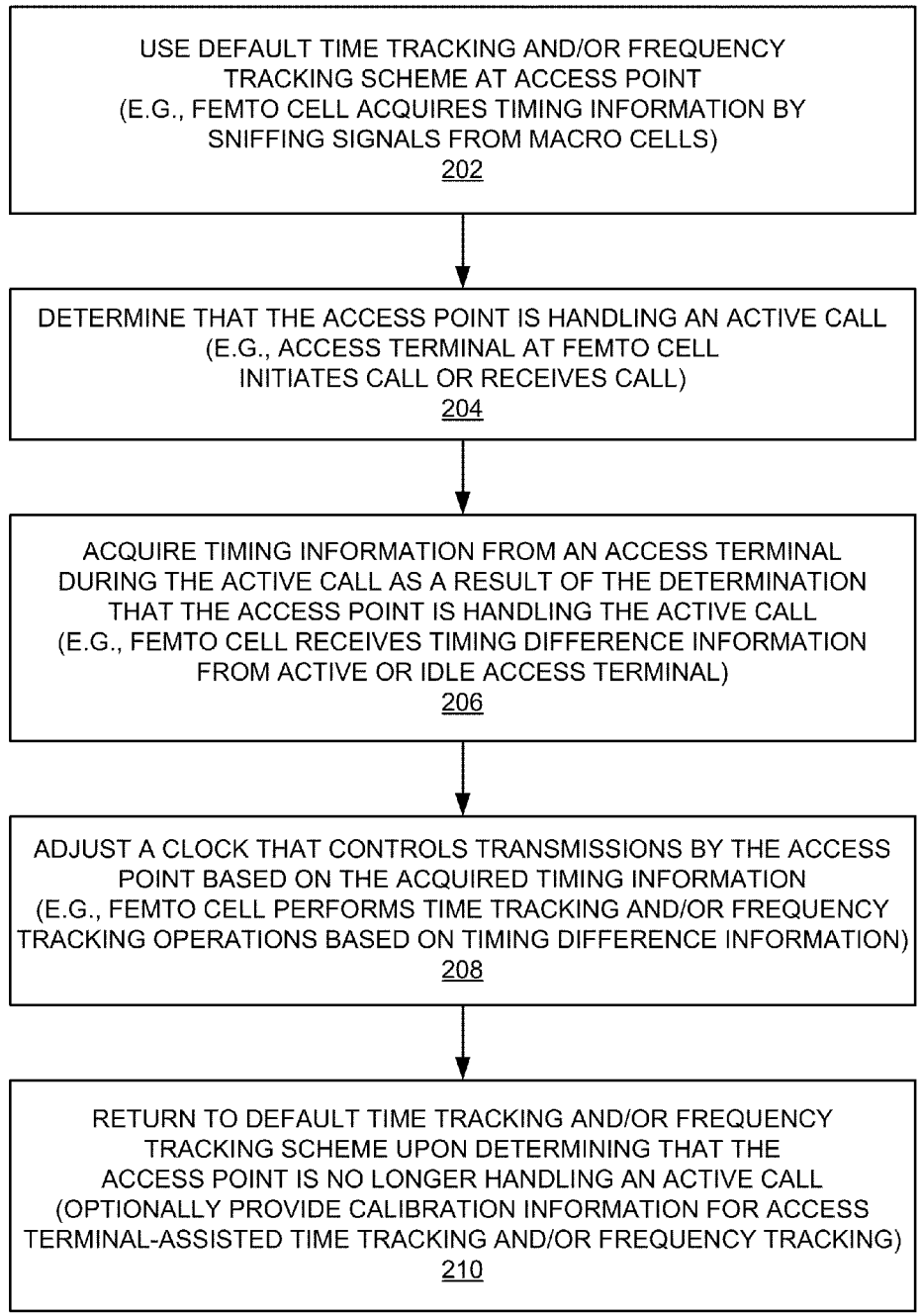
FIG. 2 is a flowchart of several sample aspects of operations that may be performed in conjunction with an access point that is handling an active call acquiring timing information from an access terminal.

FIG. 2 illustrates sample operations that may be performed at an access point in conjunction with switching to access terminal-assisted tracking when the access point is handling an active call. For purposes of illustration, in some aspects the following describes a scenario where an access point cooperates with a nearby access terminal to track timing of at least one nearby macro access point during the active call. It should be appreciated that other timing sources (e.g., pico cells, femto cells, etc.) may provide a sufficiently accurate timing source in other scenarios.

As represented by block 202, the access point may use a default time tracking and/or frequency tracking scheme when the access point is not handling any active calls. For example, the access point may employ a Network Listen Module that sniffs (e.g., turns on a receiver to acquire) signals from at least one nearby macro access point and acquire timing information from those signals. As discussed above, the access point may disable some or all of its transmissions during this sniffing operation. Once the timing information is acquired, the access point adjusts a clock that controls transmissions by the access point. In accordance with the teachings herein, this adjustment is based on the acquired timing information so that the access point maintains time and/or frequency synchronization with the at least one nearby macro access point.

As represented by block 204, at some point in time, the access point determines that it is handling an active call. For example, an access terminal idling on the access point may initiate a call through the access point, or the access point may receive a call destined for an access terminal idling on the access point.

As represented by block 206, as a result of the determination that the access point is handling an active call, the access point commences acquiring timing information from an access terminal during the active call. That is, the access point temporarily switches to access terminal-assisted time tracking and/or frequency tracking to receive timing information associated with one or more timing sources (e.g., access points) from an access terminal (e.g., the access terminal involved in the active call or some other access terminal). One advantage of using an access terminal (e.g., an active or idle access terminal) for time and/or frequency tracking here is that the access point may acquire timing information without using a Network Listen Module. Hence, complexities associated with the use of a Network Listen Module (e.g., shutting down access point transmissions) may be avoided.

As discussed in more detail below, this timing information may take various forms and be acquired in various ways. For example, the access terminal may report pilot timing difference information via a cdma2000 pilot strength measurement message (PSMM), a cdma2000 candidate frequency search report message (CFSRPM), a UMTS measurement report message (MRM), a 1×EV-DO route update message (RUM), or via another type of message used by some other type of radio technology. This pilot timing difference information may be indicative of, for example, a phase difference between a pilot signal received by the access terminal from the access point and a pilot signal received by the access terminal from a macro access point.

The access terminal may report frame timing difference information via, for example, a UMTS observed time difference (OTD) report or via another type of message used by some other type of radio technology. This frame timing phase difference information may be indicative of, for example, the difference between a time at which a frame from the access point is received by the access terminal and a time at which a frame from a macro access point is received by the access terminal. For example, an access terminal may send a system frame number-connection frame number (SFN-CFN) OTD report to its serving cell to report the time difference between the serving cell and a neighbor cell (e.g., the timing difference between the times at which frames are received from the different cells). As another example, an idle access terminal may send an OTD report to report the time difference between two cells (e.g., the timing difference between the times at which frames are received from the different cells). Here, an access terminal may send a system frame number-system frame number (SFN-SFN) OTD report (Type 1 or Type 2) when the access terminal is in idle mode or in some other state where OTD reports are supported.

The SFN-CFN OTD and/or the SFN-SFN OTD may be used for time and/or frequency tracking at an access point (e.g., a femto cell) as discussed below. This method is applicable to all access terminal states that are supported for these measurement reports. For example, an access terminal may send an SFN-SFN OTD Type 1 report in the following states: Idle mode, URA_PCH intra, CELL_PCH intra, or CELL_FACH intra. In addition, an access terminal may send an SFN-SFN OTD Type 2 report in the following states: URA_PCH intra, URA_PT inter, CELL_PCH intra, CELL_PCH inter, or CELL_FACH intra, CEL_FACH inter, CELL_DCH intra, or CELL_DCH inter.

Typically, the access point sends a request to the access terminal for this timing information. In some cases, however, the access point may acquire timing information that the access terminal sends without being requested to do so. For example, an access terminal may send a PSMM or a MRM that is triggered by certain signal conditions at the access terminal. As another example, the access terminal may send measurements periodically.

As represented by block 208, the access point adjusts a clock that controls transmissions by the access point based on the acquired timing information. For example, the access point may process the received timing information to determine the timing difference between T0 at the access point and T0 at a nearby macro access point. The access point may then adjust its clock based on this timing difference.

The adjustment of the clock may involve time tracking and/or frequency tracking. For example, in a cdma2000 system, the access point may perform time and frequency tracking. In addition, in some cases only frequency tracking may be employed in a UMTS system, while in other cases time and frequency tracking may be employed in a UMTS system.

As an example of time tracking, in the event the access point determines that its clock lags the clock of the macro access point by a certain amount of time (e.g., expressed as a number of chips), the access point may adjust the phase of its clock by that amount of time. In this way, the phase of a signal transmitted by the access point is adjusted so that the adjusted phase tracks (e.g., is synchronized with) the phase of the timing source used by the macro access point (within some permissible error margin).

As an example of frequency tracking, in the event the access point determines that the frequency of its clock differs from the frequency of the clock of the macro access point by a certain frequency deviation (e.g., as determined based on timing differences reported by the access terminal over a period of time), the access point may adjust the frequency of its clock by that frequency deviation. In this way, the frequency of a signal transmitted by the access point is adjusted so that the adjusted frequency matches the specified (i.e., the designated carrier) frequency within some permissible error margin (here, designated means the frequency at which the access point should transmit in accordance with the operational requirements of the network). In cases where the access point and macro access point operate on the same carrier frequency, this may involve the access point synchronizing its transmit frequency with a transmit frequency of the macro access point. In cases where the access point and macro access point do not operate on the same carrier frequency, this may involve the access point matching a frequency required by the network. Here, the access point may acquire the required frequency based on a transmit frequency used by the macro access point.

As represented by block 210, the access point may return to using the default time tracking and/or frequency tracking scheme once the access point is no longer handling any active calls. For example, upon determining that the access point is no longer handling an active call, the access point may recommence the use of a Network Listen Module, re-attempt acquisition of GPS-based timing if the access point includes GPS capability (e.g., which may be intermittently available if the access point is located within a building), or recommence use of some other mechanism to provide time and frequency tracking.

In addition, while using the default tracking mechanism, the access point may acquire information that is used for calibrating the access terminal-assisted tracking. For example, when the access point is synchronized to the timing of a macro access point, the access point may determine the propagation time between the access point and the macro access point. This information may then be used during access terminal-assisted tracking to, for example, calculate the timing offset between access points as discussed below.

Figure 3:
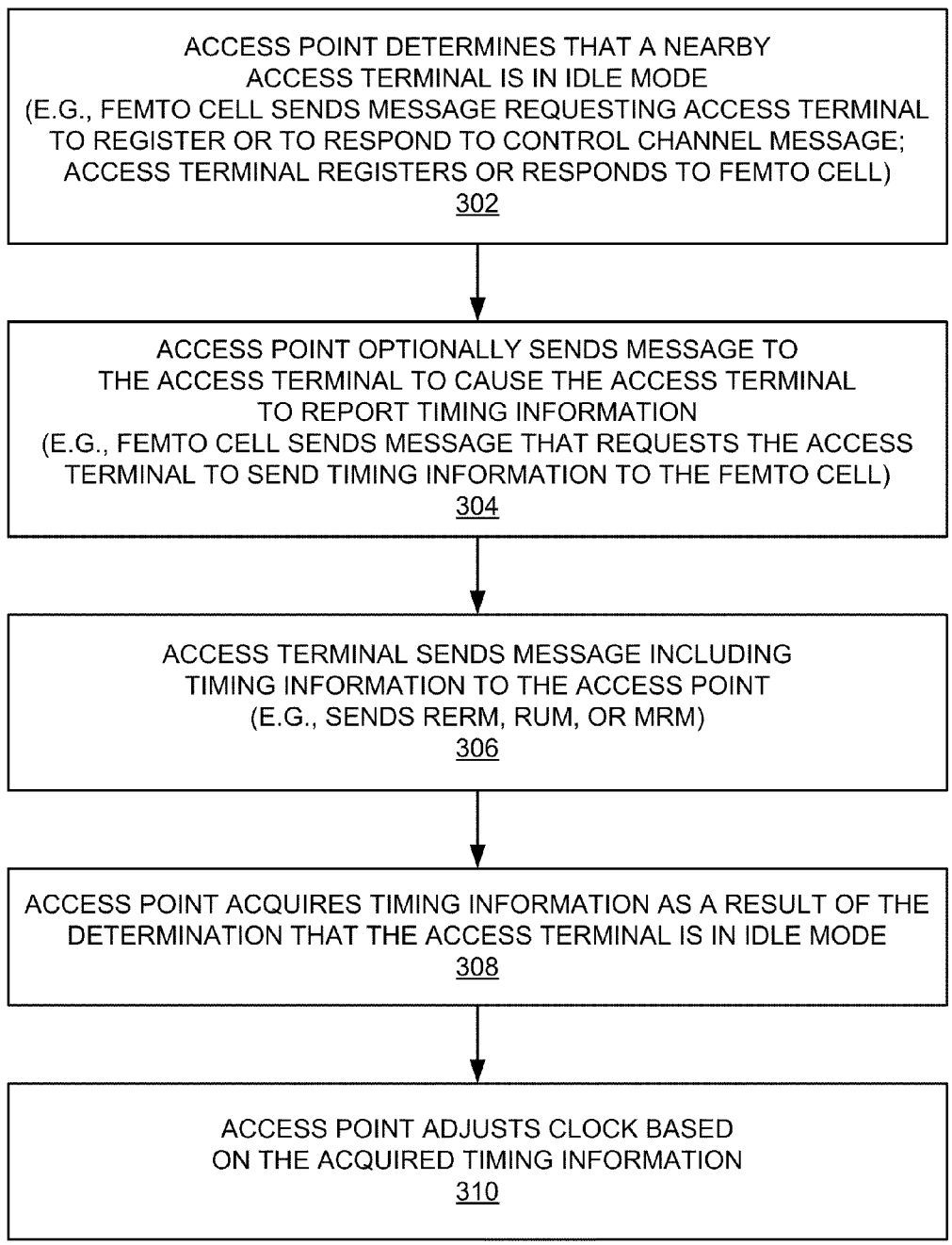
FIG. 3 is a flowchart of several sample aspects of operations that may be performed in conjunction with an access point acquiring timing information from an idle access terminal.

FIG. 3 illustrates sample operations that may be performed at an access point that cooperates with a nearby idle access terminal to synchronize to at least one timing source (e.g., a nearby macro access point). These operations may be performed independently (e.g., to acquire timing information whenever an idle access terminal is near the access point), or in conjunction with switching to access terminal-assisted tracking when the access point is handling an active call (e.g., the access point cooperates with an idle access terminal to acquire timing information during the active call). One advantage of using idle access terminals for time and/or frequency tracking is that the access point may acquire timing information without using a Network Listen Module. Hence, complexities associated with the use of a Network Listen Module (e.g., shutting down access point transmissions) may be avoided.

As represented by block 302, at some point in time the access point determines that a nearby access terminal is connected with the access point in idle mode. Here, the access point may determine whether the access terminal is idling on the access point (i.e., the access terminal is periodically monitoring the access point's FL paging channel) by, for example, sending a message to the access terminal that requests the access terminal to re-register at the access point. Receipt of a registration message from the access terminal may thus confirm that the access terminal is idling on the access point. As another example, the access point may send a message to the access terminal that requests the access terminal to respond to (e.g., acknowledge) a message the access point sends on a control channel (e.g., a paging channel). Again, the receipt of an appropriate response from the access terminal may confirm that the access terminal is idling on the access point.

As represented by block 304, in some cases, the access point also may send a message to the access terminal to cause the access terminal to report timing information to the access point. For example, the access point may send a message that explicitly requests the access terminal to send timing information. In response to such a request, the access terminal may send timing information in a dedicated message or may include the timing information in some other message that is subsequently sent to the access point. As another example, the access point may send a message that does not include such an explicit request but that may nonetheless result in the access terminal sending timing information. For example, a message that requests the access terminal to register (e.g., periodically register) with the access point may cause the access terminal to perform registration, where as a matter of course the access terminal provides timing information whenever it registers at an access point.

In some cases, the access point may not need to send the message of block 304 to the access terminal. For example, the sending of a message at block 302 that determines that the access terminal is idling on the access point may cause the access terminal to send timing information to the access point.

As represented by block 306, the access terminal sends a message including timing information to the access point. This timing information may take various forms and may be sent in various ways in different implementations. For example, in a 1×EV-DO system, the access point may send a route update message (RUM) that includes timing information relating to neighboring access points. As another example, as discussed above, an access terminal may send an SFN-SFN OTD report (Type 1 or Type 2) when the access terminal is in idle mode or in some other state where OTD reports are supported. Such a report may be sent via, for example, a measurement report message (MRM).

As yet another example, in a cdma2000 system, the access terminal may send a radio environment report message (RERM) that includes pilot phase information of neighboring access points that are on the same carrier frequency as the access point's FL carrier frequency. RERMs may be sent, for example, upon request as discussed herein or upon the occurrence of certain events (e.g., a registration attempt or a page response by the access terminal). Thus, as discussed above, the access point may request an idle mobile to repeatedly (e.g., periodically) register with the access point and, as a result, the access point may repeatedly receive RERMs from the access terminal.

As represented by block 308, the access point thus acquires timing information from an access terminal as a result of the determination that the access terminal is in idle mode. For example, upon receiving a RERM that includes macro phase information, the access point may use this information to determine how to adjust its clock for time and/or frequency tracking as described herein.

Accordingly, as represented by block 310, the access point adjusts its clock based on the acquired timing information. The operations of block 310 are thus similar to the operations described above at block 208.

Referring now to FIGS. 4-14, additional operations that may be performed to facilitate access terminal-assisted time and/or frequency tracking will now be described. In general, the operations described below may be used in a case where an access point invokes access terminal-assisted tracking during an active call, or in a case where an access point does not use this condition to invoke access terminal-assisted tracking (e.g., in a case where access terminal-assisted tracking is invoked when an access point detects a nearby idle access terminal).

Figure 4:
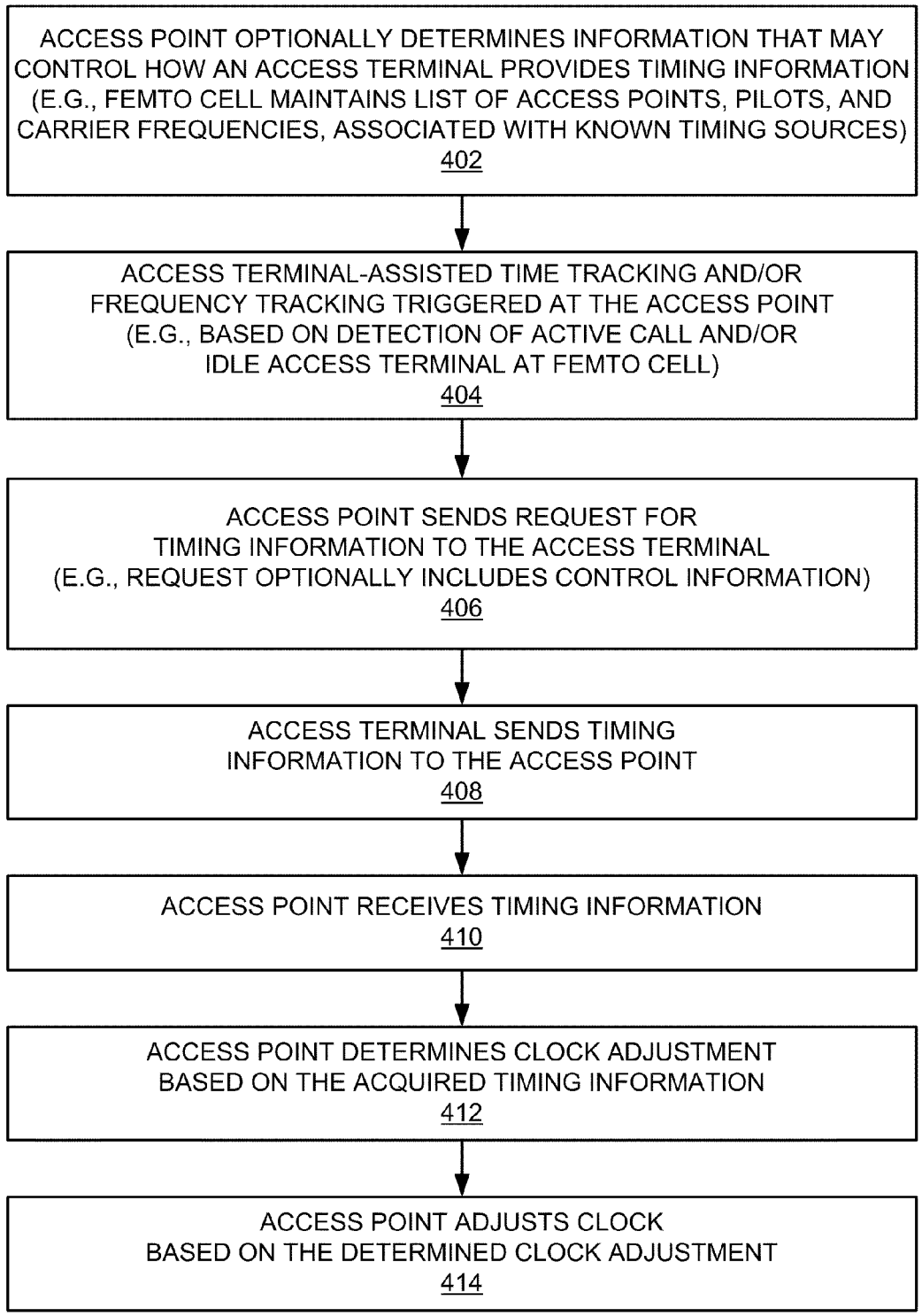
FIG. 4 is a flowchart of several sample aspects of operations that may be performed in conjunction with an access point sending a request to an access terminal for timing information.

Referring to FIG. 4, as mentioned above, an access point may specify certain aspects of how an access terminal provides timing information. For example, an access point may specify when timing information is to be provided, how often timing information is to be provided, the timing source of the timing information, and so on. Also, an access point may use idle periods in the down link (IPDL) to improve the accuracy of the access terminal reporting (e.g., pilot-based reports or OTD reports).

As represented by block 402, at some point in time, the access point may determine information that may be used by access terminals for obtaining timing information. This information may include, for example, a list of access points from which timing information is to be obtained (e.g., a list of identifiers of access points that are known to have highly accurate timing), a list of pilots for which the access terminal is to search (e.g., a list of PN offsets associated with known access points), a list of carrier frequencies on which the access terminal is to search for signals (e.g., which may or may not include the carrier frequency being used by the access point). In some implementations, this control information may take the form of a Neighbor List.

The above information may be determined in various ways. For example, the access point may receive this information from the network (e.g., from a configuration entity in the network), or the access point may learn this information over time. As a specific example, the core network may provision an access point with a list of neighboring access points via the backhaul. Alternatively, the access point may discover its neighborhood on its own through the use of a Network Listen Module or some other suitable mechanism.

As represented by block 404, at some point in time, access terminal-assisted time and/or frequency tracking is triggered at the access point. For example, as discussed above, this type of tracking may be commenced upon determining that the access point is handling an active call or upon detecting an idle access terminal at the access point.

As represented by block 406, in conjunction with commencing access terminal-assisted time and/or frequency tracking, the access point sends a request for timing information to the access terminal. For example, the access point may send a message including a specific request for timing information and including the control information described above at block 402. In some other cases, the request for timing information may not be made explicitly, but timing information may still be obtained by requesting some other information (e.g., signal strengths of other access points). When the access terminal sends back this information, timing information may also be included by default along with signal strength information.

As represented by block 408, the access terminal obtains timing information in the specified manner and sends the timing information to the access point. An example of a scenario where the access point comprises a femto cell and the neighboring access point comprises a macro cell follows.

As mentioned above, time and frequency tracking information may be derived from a macro access point that is operating on the same carrier frequency as the femto cell's operating carrier frequency or a different carrier frequency. When a macro access point shares the femto cell's FL carrier frequency, reporting such as PSMM reporting may be used to obtain the macro phase information. If the macro access point frequency is different from the femto cell's FL carrier frequency, then the femto cell may request the access terminal to search on at least one other frequency by sending a candidate frequency search request command. As discussed herein, the macro PNs to search as well as the search periodicity may be specified by the femto cell. In an inter-frequency search scenario, the access terminal intermittently tunes away from the femto cell's FL carrier frequency to search for macro pilots on the specified frequency or frequencies and reports back macro pilot strength and phase using a signaling message such as a candidate frequency search report message (CFSRPM).

As represented by block 410, the access point receives the timing information sent by the access terminal. For example, the femto cell described above may use the macro phases reported in the CFSRPM or some other message to obtain information for time and frequency tracking.

As represented by block 412, the access point determines a clock adjustment based on the acquired timing information. For example, as discussed at FIGS. 5-8, the timing information provided by the access terminal may simply provide timing information from the perspective of the access terminal (e.g., a difference in signal arrival times). This timing information may then need to be processed further to determine how much the clock at the access point is to be adjusted.

As represented by block 414, the access point adjusts its clock based on the determined clock adjustment. For example, if the clock adjustment indicates a phase differential, the access point adjusts the phase of the clock by the specified amount (e.g., a specified number of chips). In addition, if the clock adjustment indicates a frequency differential, the access point adjusts the frequency of the clock by the specified amount (e.g., a specified frequency shift).

Figure 7:
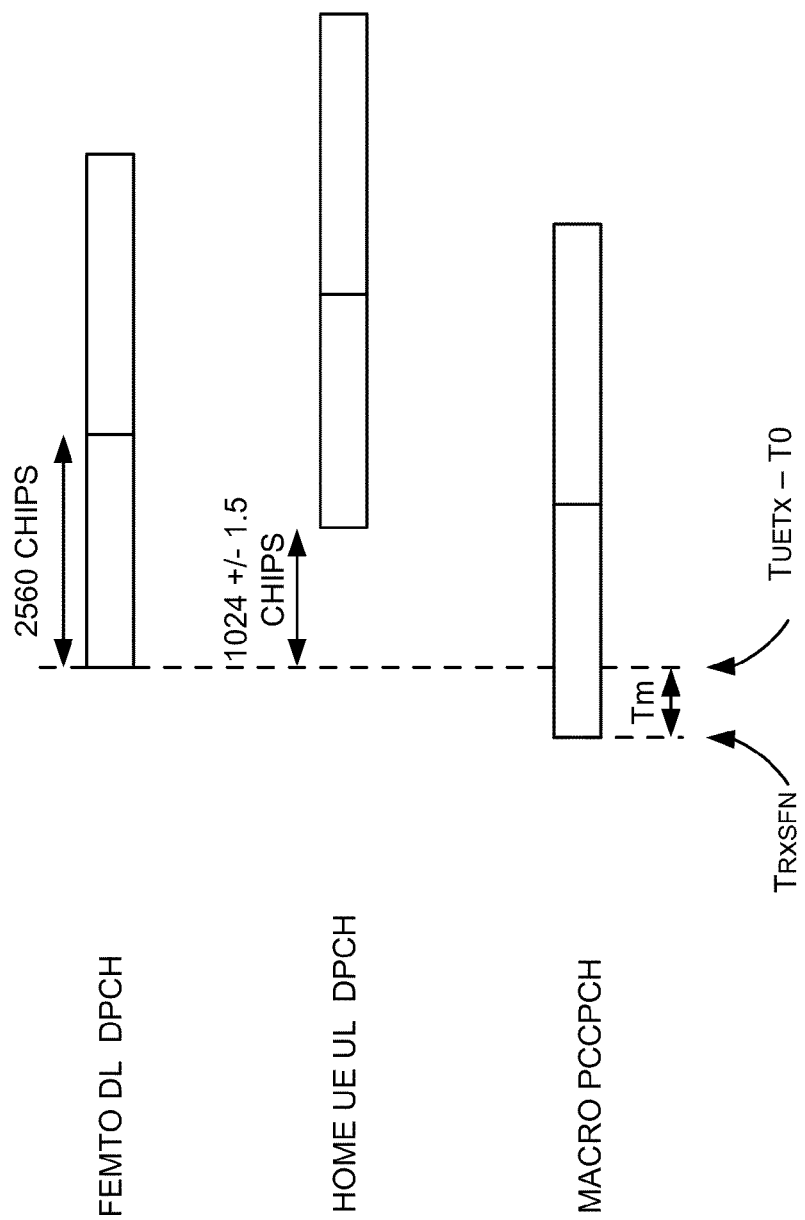
FIG. 7 is a simplified diagram illustrating a sample frame timing difference as determined by an access terminal.
Figure 8:
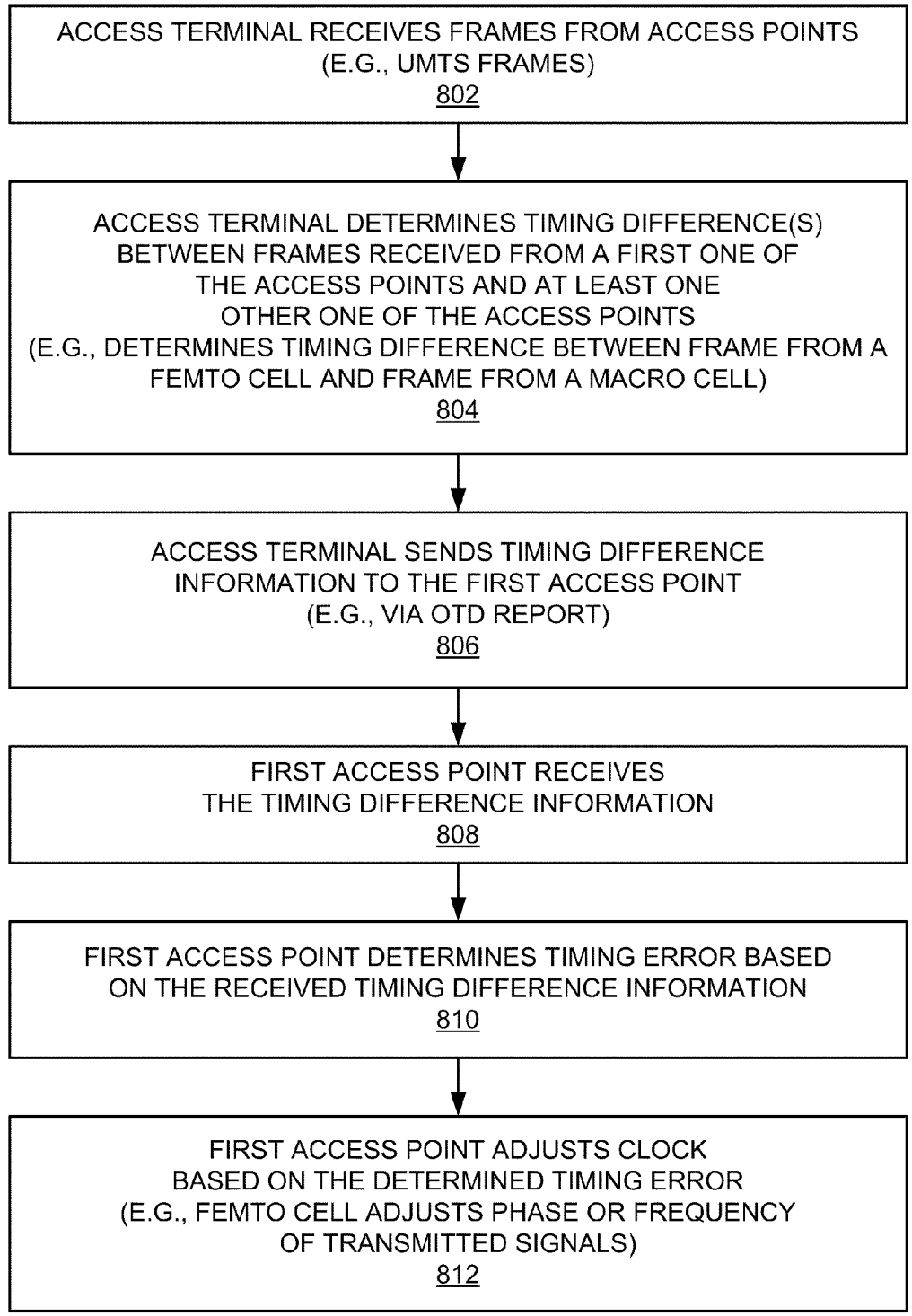
FIG. 8 is a flowchart of several sample aspects of operations that may be performed in conjunction with adjusting an access point clock based on frame timing information acquired from an access terminal.

The timing information acquired by an access point via an access terminal may take various forms. FIGS. 5-8 describe two examples where timing information is based on received pilot timing (FIGS. 5 and 6) and where timing information is based on received frame timing (FIGS. 7 and 8). It should be appreciated that timing information may be derived in other ways in other implementations.

For purposes of illustration, FIGS. 5 and 6 will be described, in part, in the context of a 1×RTT system where the serving access point comprises a femto cell and the neighboring access point comprises a macro cell. It should be appreciated, however, that these concepts may be applicable in other technologies as well.

In accordance with conventional practice, an access terminal in an active call with a macro cell or a femto cell continuously searches for other neighboring access points so that handoff may be performed to any of these neighboring access points, if needed. When the current serving access point (e.g., the access point with which the access terminal has an active call) FL signal quality is below a certain threshold and/or the neighboring access point FL signal quality is above a certain threshold, the access point reports the neighboring access point to the serving access point using a PSMM. The PSMM contains the pilot strength and the pilot phase of the neighboring access point relative to the serving access point. The access point timing typically is locked (e.g., synchronized) to the earliest arriving path from the serving access point. The phase difference between the earliest arriving path from the neighboring access point and the earliest arriving path from the serving access point is thus reported in the PSMM.

In accordance with the teachings herein, if the serving cell knows that the neighboring access point has accurate time and frequency synchronization (e.g., GPS-based timing), the serving access point may use the PN phase of the neighboring access point reported by the access terminal (e.g., the access terminal in the active call) via the PSMM to provide time and frequency tracking Thus, the techniques described herein may be advantageously employed at a serving access point that does not have accurate time and frequency tracking Here, the access point may use access terminal assistance to achieve tracking through the use of measurements from a neighboring, non-serving access point. Moreover, the described techniques may be employed even when the serving and non-serving access points are operating on different carrier frequencies by requesting the access terminal to search macro pilots on a different carrier frequency and reporting back information of macro pilots on this frequency.

In a femto cell deployment, neighboring macro access points generally will have very accurate time and frequency synchronization derived from a GPS receiver. Therefore, a femto cell may receive PSMM reports containing macro access point pilot phase information from an access terminal (e.g., an active access terminal) and use that information for time and frequency tracking.

Figure 5:
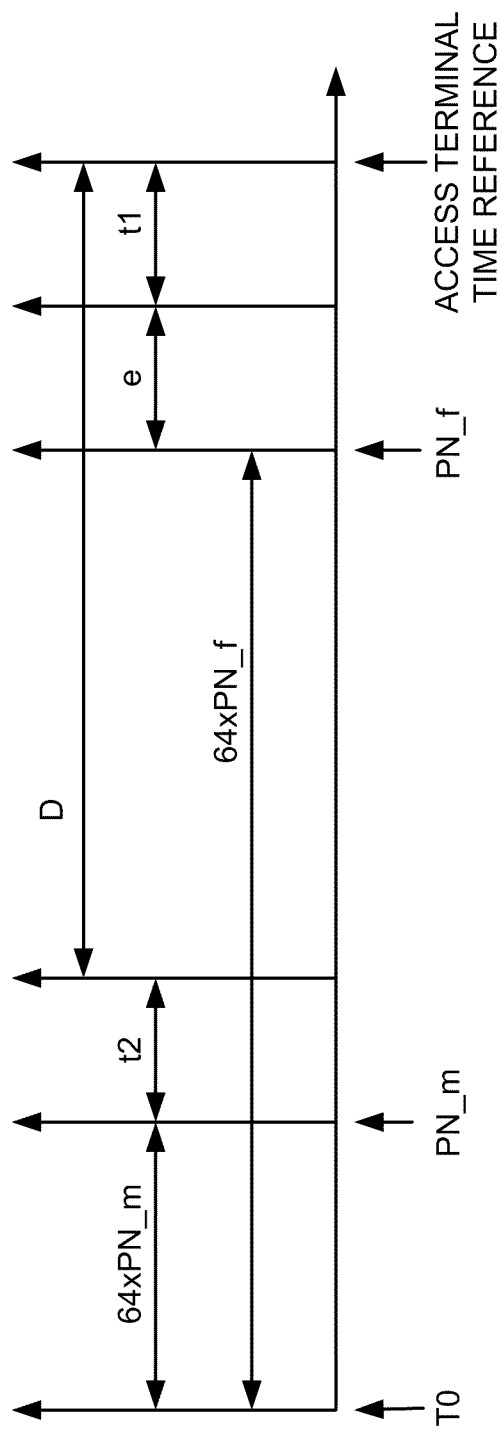
FIG. 5 is a simplified diagram illustrating a sample pilot timing difference as determined by an access terminal.

FIG. 5 is a timing diagram that illustrates pilot-based timing information that an access terminal may send to an access point. Specifically, the time difference parameter D represents the timing difference between the time at which the access terminal receives a pilot signal from its serving access point and the time at which the access terminal receives a pilot signal from a neighboring access point. Thus, the parameter D represents the relative phase difference between the femto cell and the macro cell. The parameter D may be reported, for example, in a PSMM or CFSRPM.

For purposes of illustration, assume without loss of generality that the femto cell FL frequency is F2, while a neighboring macro cell is on frequency F1. Initially, when there is no active access terminal connected to the femto cell, the femto cell synchronizes its time and frequency using other means such as using a Network Listen Module with periodic femto cell shutdown. Once an access terminal in active mode is connected to the femto cell, the femto cell requests the access terminal to perform candidate frequency searches on the macro frequency F1. Upon receiving the resulting search report, the femto cell obtains timing and frequency tracking information as follows.

In FIG. 5, T0 represents the "system time" corresponding to PN offset=0. The macro cell PN offset is represented by PN_m, while the femto cell PN offset is represented by PN_f. The parameter t2 represents the propagation delay (one way delay) between the macro cell and the access terminal for the earliest arrival path. The parameter t1 represents the propagation delay (one way delay) between the femto cell and the access terminal for the earliest arrival path. The parameter (e) represents the timing error at the femto cell. Note that it is assumed that the macro cell accurately tracks "system time."

The phase offset reported in the CFSRPM message corresponds to: D=(To+PN_f+e+t1)−(To+PN_m+t2)=(PN_f−PN_m)+(e+t1−t2). Here, the access terminal can correctly search for the macro cell if the delay (e+t1−t2) is less than the search window used for searching the macro sectors. Also, the femto cell may accurately derive PN_m from the reported D as long as (e+t1−t2) is less than 64*PILOT_INC (pilot increment parameter) used in the system.

Once the femto cell determines PN_m, the effective phase difference reported by the access terminal is: Deff=e+t1−t2. This phase difference includes the timing error (e) at the femto cell and timing delays due to propagation. Typically, in femto cell environments, t1 is less than 1 chip. Similarly, in most macro networks, t2 is likely to be on the order of a few chips (1 chip~230 m propagation distance, thus a 2-3 chip delay may cover very large macro cell sizes). Thus, the contribution of the propagation delays is small and likely to be comparable to the timing error (e). Consequently, the timing error may be estimated as the effective macro phase Deff. This value may then be used by the femto cell to correct its timing (e.g., adjust its clock).

Additional mechanisms may be employed by the femto cell to learn t2, if desired. For example, the one way delay may be reported to the femto cell by the core network when an active access terminal performs a handoff from the macro cell to the femto cell. Thus, the femto cell may record an approximate value of t2 based on past handoffs, and subsequently use this value to correct timing during access terminal-assisted tracking.

Alternately, the core network may provide an approximate one way delay value to the femto cell based on information that the femto cell is in the coverage region of a particular macro cell.

In another example, based on occasional availability of a GPS signal (in an implementation where a femto has GPS capabilities), the femto cell may synchronize it's timing to GPS time, and then use the Network Listen Mode or PSMMs to measure the received macro signal's PN phase information. This information may then be subsequently used as the one way propagation delay during access terminal-assisted tracking (e.g., in the absence of a GPS signal).

In the above discussion, the presence of frequency error at the femto cell was ignored. In practice, frequency error will introduce timing drift (i.e., the error (e) will vary with time). In such a case, the effective reported macro phase may be written as: Deff(n)=e(n)+t1(n)−t2(n), where n is the time index.

In femto cell environments where users are stationary or walking at a very slow speed, t1(n) and t2(n) are not expected to vary with time. Thus, Deff(n) may be approximated as: Deff(n)=e(n)+t1−t2.

In the absence of any other errors related to estimating the received macro signal's PN phase, the rate of change of this phase difference is equal to the frequency error. Thus, by requesting multiple CFSRPMs from the access terminal, the femto cell may use a robust algorithm to determine its frequency error and compensate for the same, even in the presence of errors related to estimating the received macro signal's PN phase.

Figure 6:
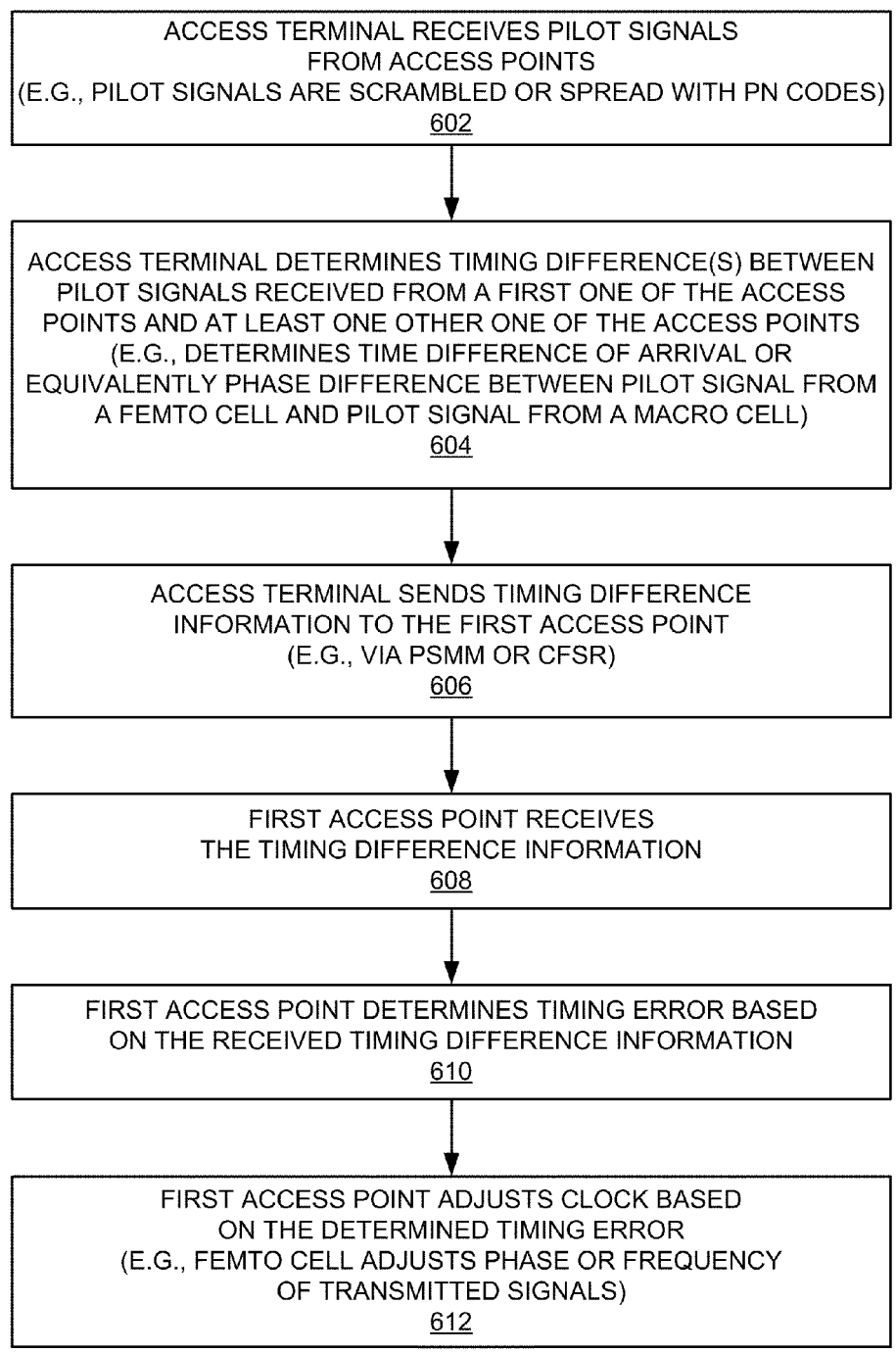
FIG. 6 is a flowchart of several sample aspects of operations that may be performed in conjunction with adjusting an access point clock based on pilot timing information acquired from an access terminal.

With the above in mind, FIG. 6 describes sample operations for an implementation wherein timing information is based on received pilot signal timing.

As represented by block 602, the access terminal receives pilot signals from nearby access points. As discussed above, each of these pilot signals may comprise a different PN code offset.

As represented by block 604, the access terminal determines a timing difference between a first one of the access points (e.g., a serving femto cell) and at least one other one of the access points (e.g., a macro cell). This may involve, for example, determining the parameter D as discussed above.

As represented by block 606, the access terminal sends the timing difference information to the first access point. For example, the access terminal may send the parameter D via a PSMM or CFSRPM as discussed herein. The first access point receives this timing difference information as represented by block 608.

As represented by block 610, the first access point determines its timing error based on the received timing difference information. This may involve, for example, calculating or estimating the parameter (e) as discussed above.

As represented by block 612, the first access point adjusts a clock used for transmitting signals based on the determined timing error. For example, the first access point may adjust the phase of the clock based on a single timing error value or based on several timing error values received from the access terminal over a period of time (e.g., by calculating an average of the timing error values over a certain duration). Also, as discussed in more detail below, the first access point may adjust the frequency of the clock based on the rate of change of timing error values received from the access terminal over a period of time.

FIGS. 7 and 8 illustrate an example of an implementation that employs frame-based timing information. For example, if it is known that a neighboring access point has accurate time and frequency synchronization, then a serving access point may use the observed time difference (OTD) reported by an access terminal in an active call, idle mode, or other supported states to provide time and/or frequency tracking.

For example, a femto cell may use access terminal measurement reports containing the OTD between the femto cell and a macro cell for time and/or frequency tracking.

FIG. 7 is a timing diagram that illustrates frame-based timing information that an access terminal (UE) may send to an access point. In general, the time difference parameter Tm represents the timing difference between the time at which the access terminal receives a frame from its serving access point (e.g., a femto cell) and the time at which the access terminal receives a frame from another access point (e.g., a macro cell). For example, the parameter Tm may represent the time difference (in units of chip) between the femto cell DL DPCH (dedicated physical channel) frame at the access terminal (e.g., a Home UE) and the macro cell PCCPCH (primary common control physical channel) frame at the access terminal. This Tm value may be used by the femto cell for frequency and time tracking as discussed herein.

An example of an SFN-CFN OTD that includes Tm is as follows: SFN-CFN OTD=OFF×38400+Tm (See 3GPP TS25.215).

Here, Tm=(TUETx−T0)−TRxSFN, given in chip units with the range [0, 1, . . . , 38399] chips. TUETx is the time when the access terminal (UE) transmits an uplink DPCCH frame. The uplink DPCCH/DPDCH frame transmission takes place approximately T0 chips after the reception of the first detected path (in time) of the corresponding downlink DPCCH/DPDCH or F-DPCH frame. T0 is a constant defined to be 1024 chips. TRxSFN is the time at the beginning of the neighboring P-CCPCH frame received most recent in time before the time instant TUETx−T0 in the access terminal.

Also, OFF=(SFN−CFNTx) mod 256, given in number of frames with the range [0, 1, . . . , 255] frames. CFNTx is the connection frame number for the access terminal (UE) transmission of an uplink DPCCH frame at the time TUETx. SFN is the system frame number for the neighboring P-CCPCH frame received in the access terminal at the time TRxSFN. In the inter-frequency case, the access terminal is not required to read SFN (OFF is set to 0).

Similarly, SFN-SFN OTD may be used for time and frequency tracking when there is an access terminal in idle mode (or other supported states) with the femto cell. In this case: SFN-SFN OTD Type 1=OFF×38400+Tm (See 3GPP TS25.215). A similar scheme may be employed for SFN-SFN OTD Type 2.

Here, Tm=TRxSFNj−TRxSFNi, given in chip units with the range [0, 1, . . . , 38399] chips. TRxSFNj is the time at the beginning of a received neighboring P-CCPCH frame from cell j. TRxSFNi is the time at the beginning of the P-CCPCH frame from serving cell i of most recent in time before the time instant TRxSFNj in the access terminal (UE).

Also, OFF=(SFNi−SFNj) mod 256, given in number of frames with the range [0, 1, . . . , 255] frames. SFNj is the system frame number for downlink P-CCPCH frame from cell j in the access terminal (UE) at the time TRxSFNj. SFNi is the system frame number for the P-CCPCH frame from serving cell i in the access terminal at the time TRxSFNi.

With the above in mind, FIG. 8 describes sample operations for an implementation wherein timing information is based on received frame timing.

As represented by block 802, the access terminal receives frames from nearby access points. As discussed above, the access terminal may receive these frames at different times.

As represented by block 804, the access terminal determines a timing difference between frames received from a first one of the access points (e.g., a serving femto cell) and at least one other one of the access points (e.g., a macro cell). This may involve, for example, determining the parameter SFN-CFN OTD as discussed above.

As represented by block 806, the access terminal sends the timing difference information to the first access point. For example, the access terminal may send the parameter SFN-CFN OTD via an MRM as discussed herein. The first access point receives this timing difference information as represented by block 808.

As represented by block 810, the first access point determines its timing error based on the received timing difference information. This may involve, for example, calculating or estimating the parameter Tm. Here, it should be appreciated that the access point may readily remove the parameter OFF×38400 from the parameter SFN-CFN OTD since this is a multiple of the number of chips in a frame.

As represented by block 812, the first access point adjusts a clock used for transmitting signals based on the determined timing error. For example, the first access point may adjust the phase of the clock based on a single timing error value or based on several timing error values received from the access terminal over a period of time (e.g., by calculating an average of the timing error values over a certain duration). Also, as discussed in more detail below, the first access point may adjust the frequency of the clock based on the rate of change of timing error values received from the access terminal over a period of time.

Many of the procedures described herein in conjunction with other figures may apply to a received frame timing-based tracking scheme. For example, the accuracy of the estimated time and/or frequency error may be improved by requesting the access terminal to send periodic MRMs.

As mentioned above, using OTD reports for frequency and time tracking is applicable when the access terminal is in CELL_DCH, IDLE mode or any other state for which OTD is supported. In the idle mode, one potential issue is that the femto cell may not know when the access terminal leaves the femto cell (e.g., reselects to a macro cell). However, the femto cell may request periodic location updates from the access terminal or change the femto cell location area code (LAC) to be able to detect whether the access terminal is still there or not.

Figure 9:
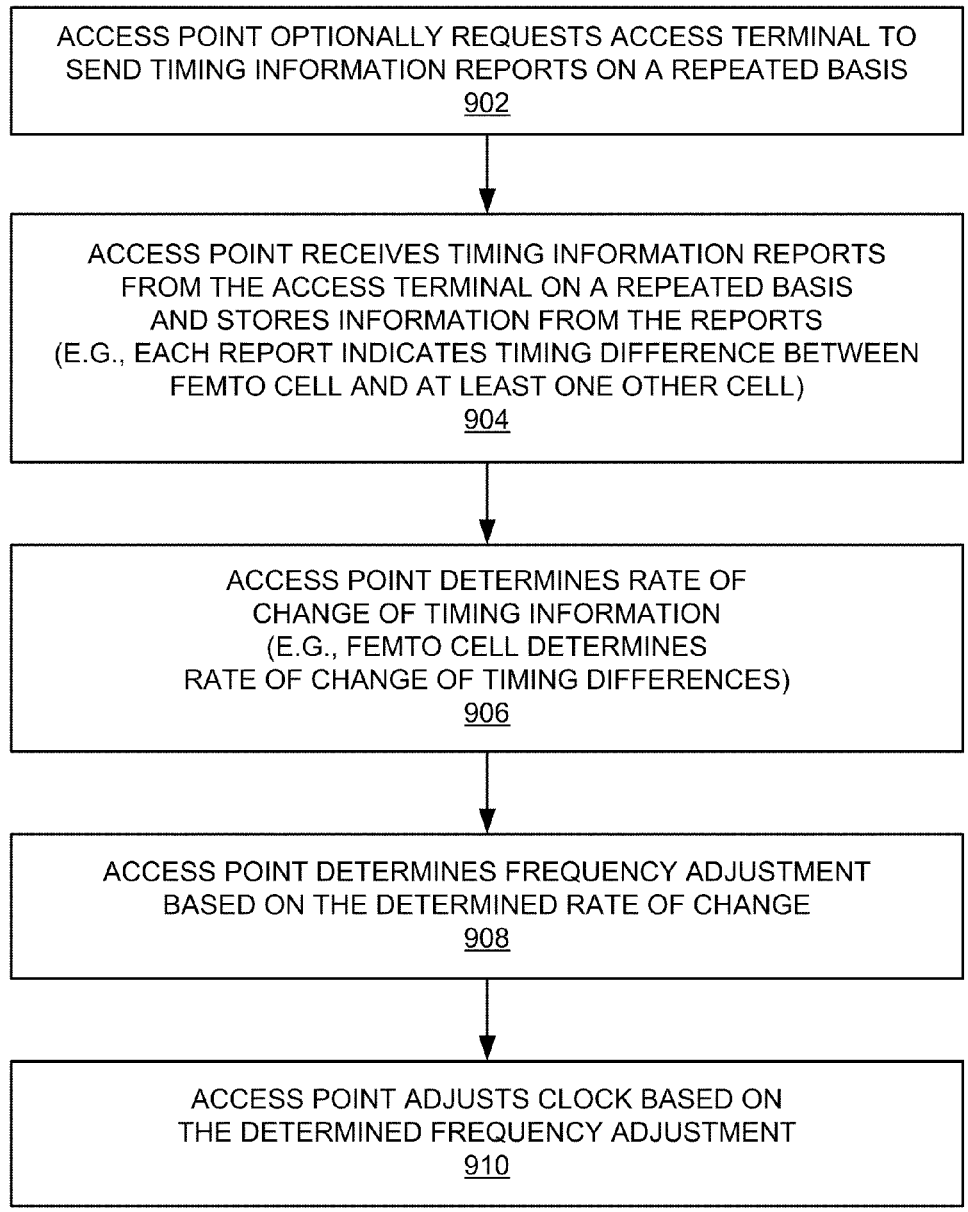
FIG. 9 is a flowchart of several sample aspects of operations that may be performed in conjunction with an access point determining a frequency adjustment based on timing information received from an access terminal.

FIG. 9 illustrates sample operations that may be performed to provide frequency tracking as taught herein. Frequency drift of a femto cell translates into timing drift of the timing information received from an access terminal (e.g., timing (phase) drift of measured macro pilots or timing drift of measured OTDs). By collecting timing information over time (e.g., several macro PN phase measurements or several OTD measurements), this time drift and therefore the femto cell's frequency drift may be estimated. For example, a femto cell may request periodic reports (e.g., PSMMs or MRMs) from an access terminal, divide the received measurements into different time intervals, estimate frequency drift over each interval using linear regression, and select the average or the median of these estimates as the frequency drift to be corrected.

As represented by block 902, to obtain reports over a period of time, the access point may need to send a message that requests the access terminal to send timing information reports on a repeated basis (e.g. periodically). As represented by block 904, the access point receives timing information reports from the access terminal on a repeated basis (e.g., once every few seconds) and then stores information from the reports. For example, the access point may store the parameter D, the parameter (e), the parameter SFN-CFN OTD, or the parameter Tm. As represented by block 906, the access point determines the rate of change of the timing information over a period of time. For example, the access point may determine the rate of change of the parameter (e) or the parameter Tm. As represented by blocks 908 and 910, the access point then determines a frequency adjustment based on the determined rate of change and adjusts the clock based on the determined frequency adjustment.

Figure 10:
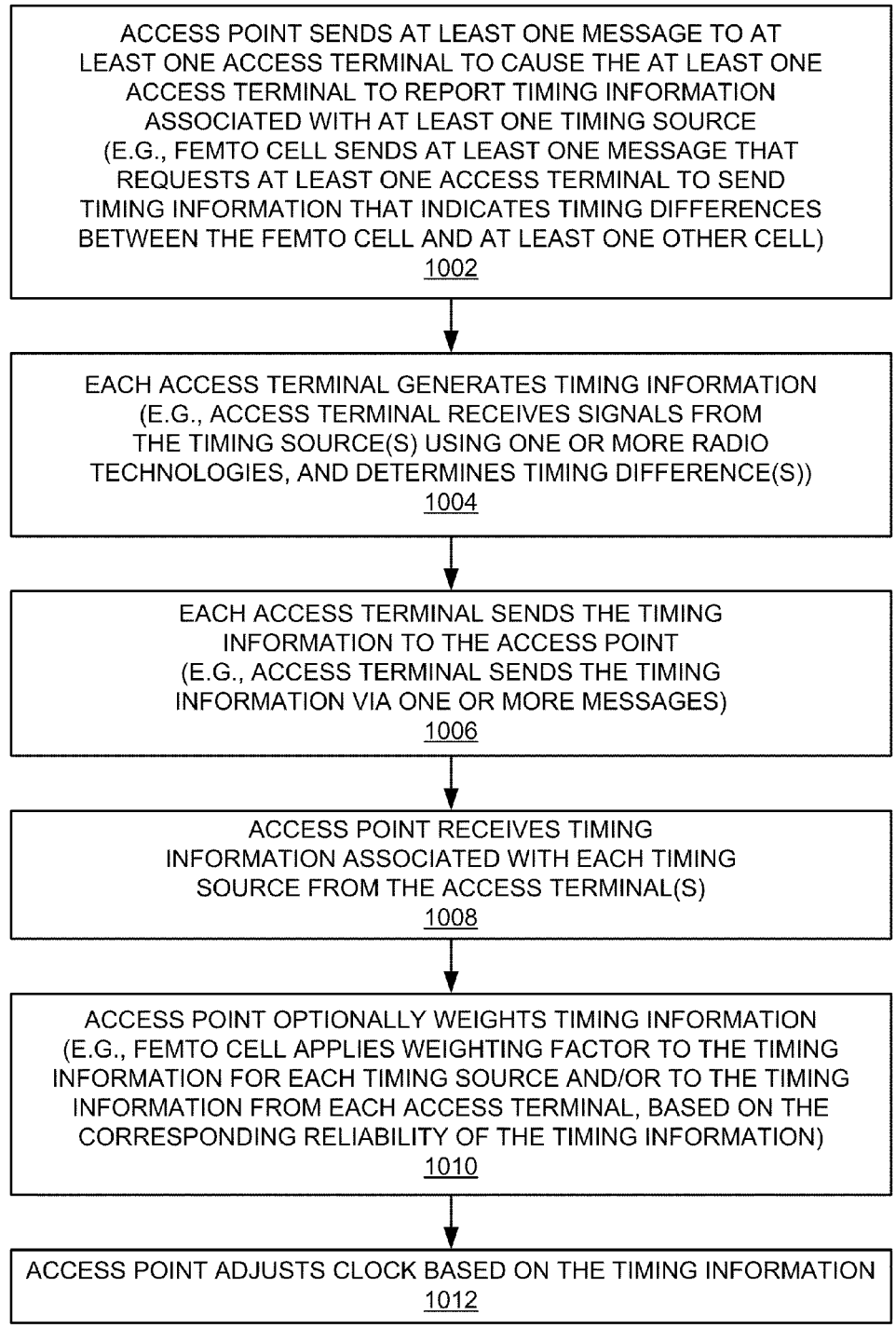
FIG. 10 is a flowchart of several sample aspects of operations that may be performed in conjunction with an access point acquiring timing information associated with at least one timing source from at least one access terminal.
Figure 11:
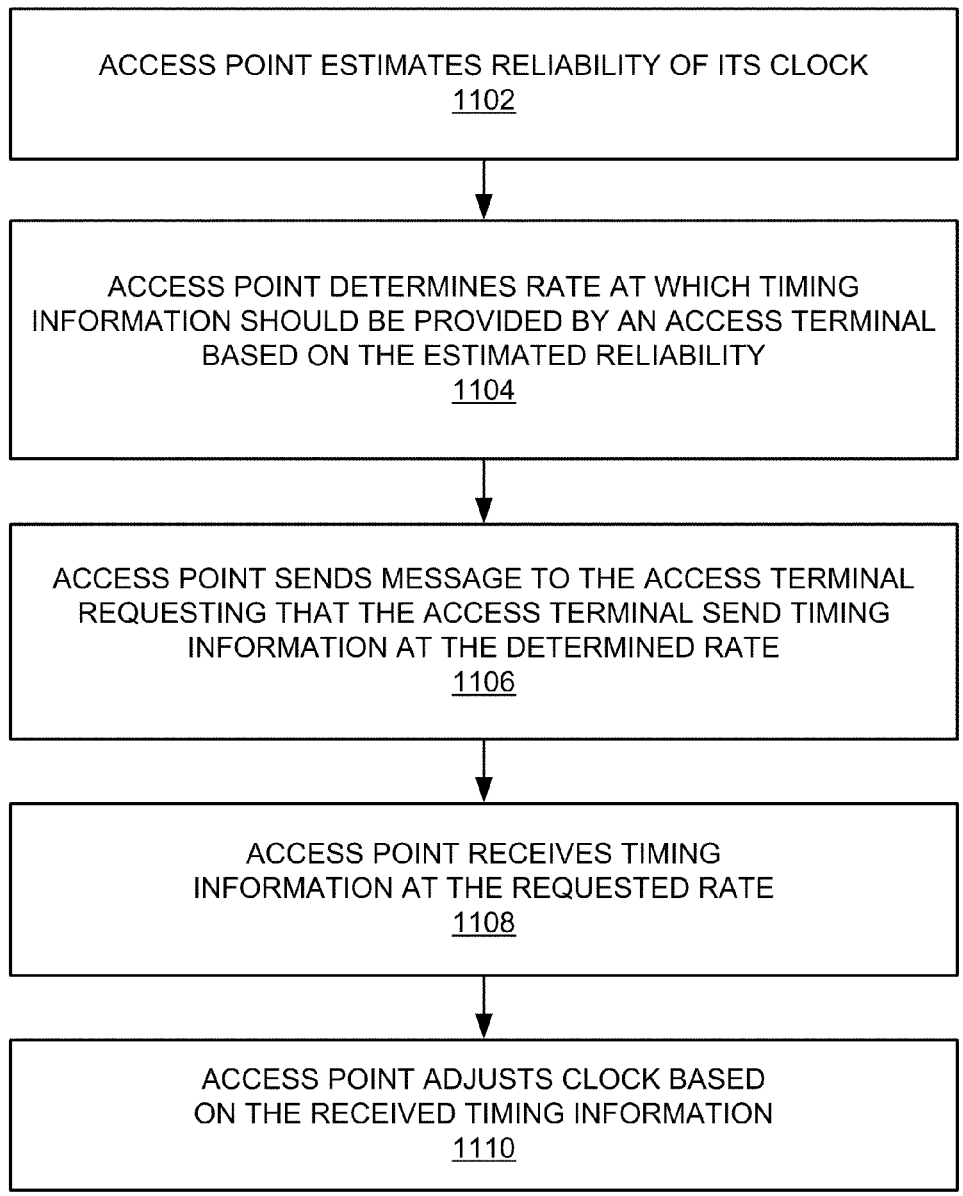
FIG. 11 is a flowchart of several sample aspects of operations that may be performed in conjunction with an access point acquiring timing information from an access terminal at a specified rate.

Referring now to FIGS. 10 and 11, an access point may acquire timing information from a variety of timing sources. For example, a femto cell may request an access terminal to report timing information from multiple timing sources (e.g., request the access terminal to measure and report phase difference between its own pilot and multiple macro pilots, or measure and report OTDs with respect to multiple macro access points), after which the femto cell jointly uses the timing information from these macro access points for tracking purpose. In addition, a femto cell may request multiple access terminals to each report timing information (e.g., request each access terminal to measure and report at least one macro pilot, or measure and report OTDs with respect to at least one macro access point), after which the femto cell jointly uses the timing information received from these access terminals (e.g. via PSMMs, CFSRPMs, or MRMs) for tracking purpose. Here, a given one of these access terminals may be idling on or in an active call with the femto cell.

As mentioned above, the teachings herein may be employed in various technologies. For example, the described techniques may be used in cdma2000 1×RTT, UMTS, WiMax, LTE, GSM, and other technologies. In addition, an access point may perform time and/or frequency tracking based on timing information associated with one or more technologies. For example, an access point may acquire timing information from a cdma2000 timing source and a UMTS source, and adjust its clock based on a combination (e.g., weighted combination) of this timing information. This multi-technology timing information may be obtained, for example, via an access terminal that supports multiple technologies. As another example, this multi-technology timing information may be obtained via different access terminals that each support a different technology in a case where the access point supports communicating with different access terminals via different technologies.

FIG. 10 illustrates sample operations where an access point requests at least one access terminal to report timing information associated with at least one timing source. For example, in some cases, the access point may send a request to one access terminal to report timing information for one timing source. In some cases, the access point may send a request to one access terminal to report timing information for multiple timing sources. In some cases, the access point may send requests to multiple access terminals to report timing information for one timing source. In some cases, the access point may send requests to multiple access terminals to report timing information for multiple timing sources (e.g., where the same or different timing sources may be specified for different access terminals).

As represented by block 1002, the access point sends a message to each access terminal, whereby the message causes the access terminal to report timing information associated with at least one timing source. For example, a femto cell may send a message that explicitly requests an access terminal to determine and report timing differences between the femto cell and several other cells. As discussed herein, in some cases, such a request may specify, for example, particular access points, cells, pilot PN codes, or frequencies from which the timing information is to be acquired.

As represented by block 1004, each access terminal generates timing information associated with its corresponding timing source(s) as discussed herein. For example, the access terminal may receive signals from the different timing sources using the appropriate radio technology for each timing source, if applicable. Then, for each timing source, the access terminal determines the timing difference between the access point (e.g., the femto cell) and the timing source (e.g., a macro access point).

As represented by block 1006, each access terminal sends its timing information to the access point. This information may be sent via a single message or multiple messages.

As represented by block 1008, the access point receives the timing information sent by each access terminal. Accordingly, the access point may acquire different timing information associated with different timing sources. In addition, or alternatively, the access point may acquire different timing information from different access terminals.

As represented by block 1010, in some implementations, the access point may weight the timing information. For example, a femto cell may apply a weighting factor to the timing information associated with a given timing source based on the reliability of that timing source (e.g., where the reliability may be determined from the perspective of the access terminal that provided the timing information). An example of such a weighting scheme is described in more detail below in conjunction with FIG. 14.

As represented by block 1012, the access point adjusts its clock based on the received timing information. As discussed herein, this timing information may have been received from different access terminals and/or may be associated with different timing sources. Thus, the weighting may be applied based on the different access terminals that provided the timing information and/or the different timing sources. For example, the access point may determine the average of a set of weighted timing error values associated with the different timing sources and use the resulting average to adjust the clock. Alternatively, the access point may determine the worst case (e.g., highest) value of a set of weighted timing error values associated with the different timing sources and use that worst case value to adjust the clock. As another example, the access point may determine the average of a set of weighted timing error values associated with the different access terminals and use the resulting average to adjust the clock. Alternatively, the access point may determine the worst case (e.g., highest) value of a set of weighted timing error values associated with the different access terminals and use that worst case value to adjust the clock.

Referring now to FIG. 11, the accuracy of the estimated time and/or frequency error may be improved by requesting an access terminal to repeatedly send timing information (e.g., send periodic PSMMs or MRMs). The rate at which the timing information is sent may be set by a femto cell by estimating the reliability of the femto cell's current time and frequency accuracy, and estimating how frequently macro measurements will be needed before time and frequency error become unacceptable.

Accordingly, as represented by block 1102, the access point estimates the reliability of its clock (e.g., on a repeated basis). This may involve, for example, keeping track of the magnitude of the timing error adjustments that are made for the clock.

As represented by block 1104, the access point determines the rate at which timing information should be provided by the access terminal based on the estimated reliability of the clock. For example, if the magnitudes of the timing error adjustments are relatively large, it may be necessary to receive timing information at a higher (faster) rate to ensure that the clock is adjusted frequently enough so that the access point continues to meet system timing requirements. Conversely, if the magnitudes of the timing error adjustments are relatively small, the timing information may be received at a lower (slower) rate.

As represented by block 1106, the access point sends a message to the access terminal that requests the access terminal to send timing information at the rate determined at block 1104. Accordingly, the access point will receive timing information from the access terminal at the requested rate as represented by block 1108.

As represented by block 1110, the access point adjusts its clock based on the received timing information as discussed herein. The access point may repeat the operations of blocks 1102-1106 to update the requested rate, as needed, based on the currently reliability of the clock.

Figure 12:
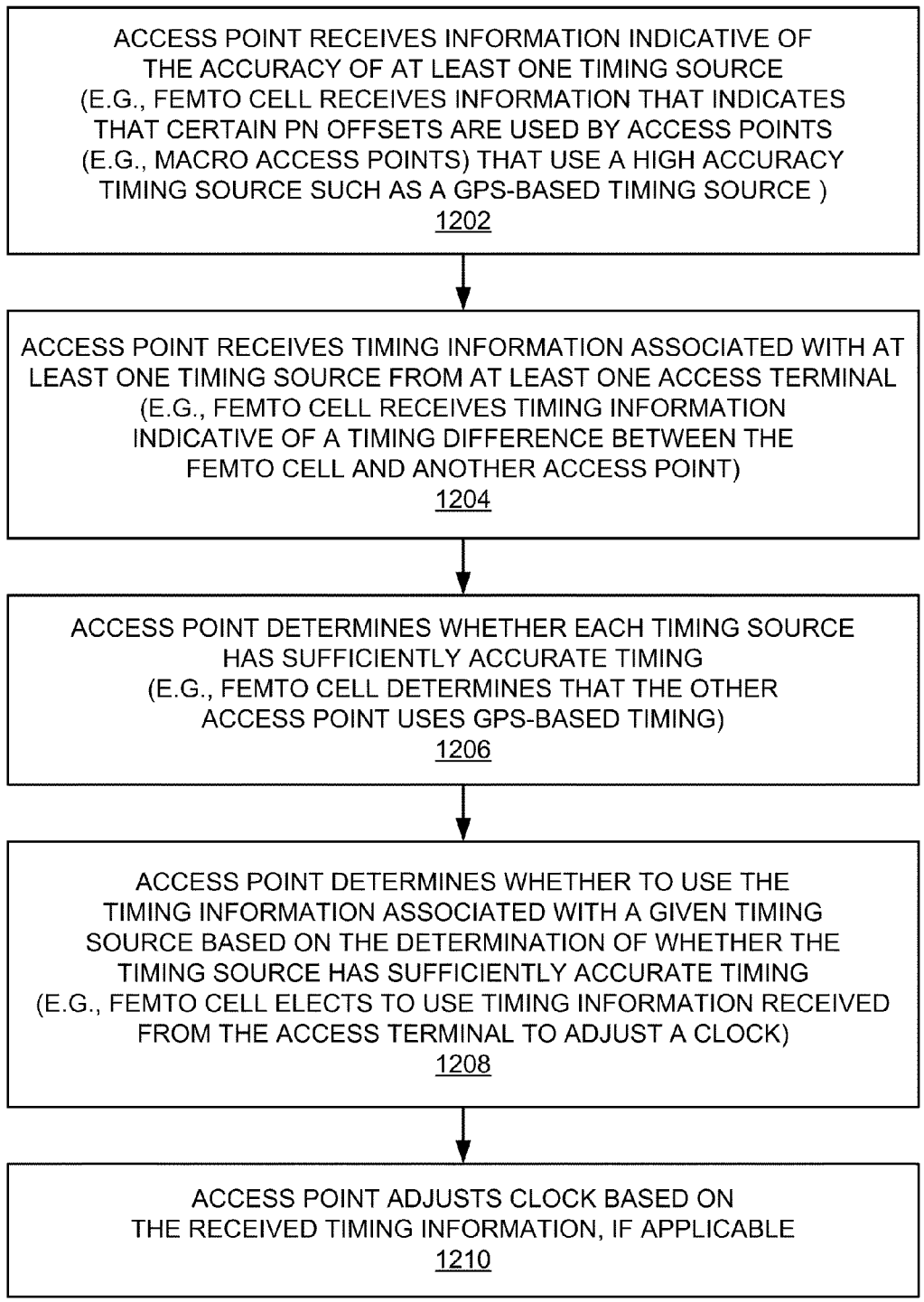
FIG. 12 is a flowchart of several sample aspects of operations that may be performed in conjunction with an access point electing to acquire timing information from a timing source if the timing source has sufficiently accurate timing.

FIG. 12 describes sample operations that an access point may perform to determine whether to use timing information from a timing source. In particular, this decision may be based on the accuracy of the timing source (e.g., whether the timing source is GPS-based).

As represented by block 1202, at some point in time, the access point receives information indicative of the accuracy of one or more timing sources. For example, a femto cell may determine that certain PN offsets are used by access points (e.g., macro access points) that use a highly accurate timing source. Alternatively, the femto cell may receive a message (e.g., an overhead message) that indicates that a given access point has an accurate timing source. In some cases, the access point receives this type of information from the network (e.g., from a configuration server) via the backhaul. In some cases, the access point may learn this type of information (e.g., by analyzing received timing information).

As represented by block 1204, at some point in time, the access point receives timing information associated with at least one timing source from at least one access terminal (e.g., as discussed herein). For example, a femto cell may receive the parameter D or the parameter SFN-CFN OTD as discussed above.

As represented by block 1206, for each timing source, the access point determines whether that timing source has sufficiently accurate timing. For example, a femto cell may determine that a reported PN phase belongs to a macro access point by mapping the reported phase to a PN Offset and verifying that this PN Offset belongs to a macro access point (e.g., that uses GPS-based timing).

As represented by block 1208, the access point determines whether to use the timing information associated with a given timing source based on whether that timing source has sufficiently accurate timing. For example, if the timing source is sufficiently accurate, the femto cell may elect to use the associated timing information to adjust its clock at block 1210.

Figure 13:
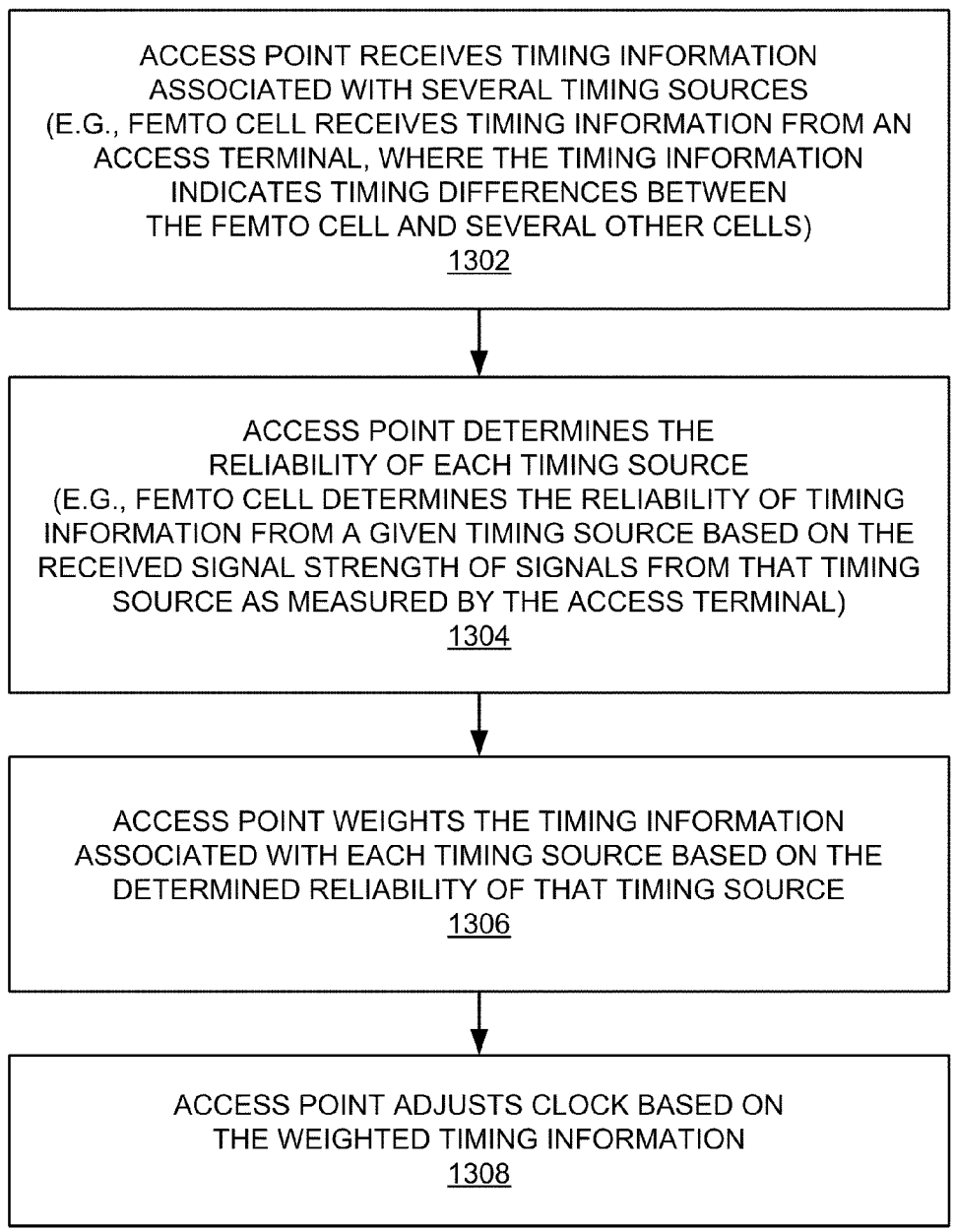
FIG. 13 is a flowchart of several sample aspects of operations that may be performed in conjunction with an access point weighting timing information from different timing sources based on the reliability of the timing sources.

FIG. 13 illustrates sample operations that may be performed for an implementation where timing information from different timing sources are weighted based on the reliability of the timing sources.

As represented by block 1302, the access point receives timing information associated with several timing sources from at least one access terminal (e.g., as discussed herein). For example, a femto cell may receive the parameter D or the parameter SFN-CFN OTD as discussed above for each timing source.

As represented by block 1304, the access point determines the reliability of each timing source. For example, the access terminal that reported the timing information for that timing source also may report the received signal strength of the signal (e.g., pilot channel signal, common channel signal, or dedicated channel signal) from which the access acquired the timing information. Accordingly, the femto cell may rank the reliability of a given timing source based on the corresponding received signal strength.

As represented by block 1306, the access point then weights the timing information associated with a given timing source based on the determined reliability of that timing source. For example, a femto cell may apply a weighting factor to the timing information received from a given access terminal based on the magnitude of the corresponding received signal strength (e.g., a higher received signal strength corresponds to a higher weight).

As represented by block 1308, the access point adjusts its clock based on the weighted timing information. For example, the access point may determine the average of a set of weighted timing error values associated with the different timing sources and use the resulting average to adjust the clock. Alternatively, the access point may determine the worst case (e.g., highest) value of a set of weighted timing error values associated with the different timing sources and use that worst case value to adjust the clock.

Other techniques may be employed in accordance with the teachings herein to generate an error correction value that is used to adjust a clock. For example, an access point may filter the reports (e.g., PSMMs or MRMs) it receives over a period of time (e.g., a few minutes). The access point may remove any reports with a reported macro Ecp/Io that is less that a specified threshold (e.g., −18 dB). The access point may then compute a frequency error for each timing source (e.g., for each reported macro primary scrambling code). Next, the access point may determine a weighted average of the frequency errors (e.g., where the weights are proportional to the number of reports received for the macro cell). The access point may then apply frequency error correction (e.g., adjust the frequency of the clock) based on the determined weighted average.

Figure 14:
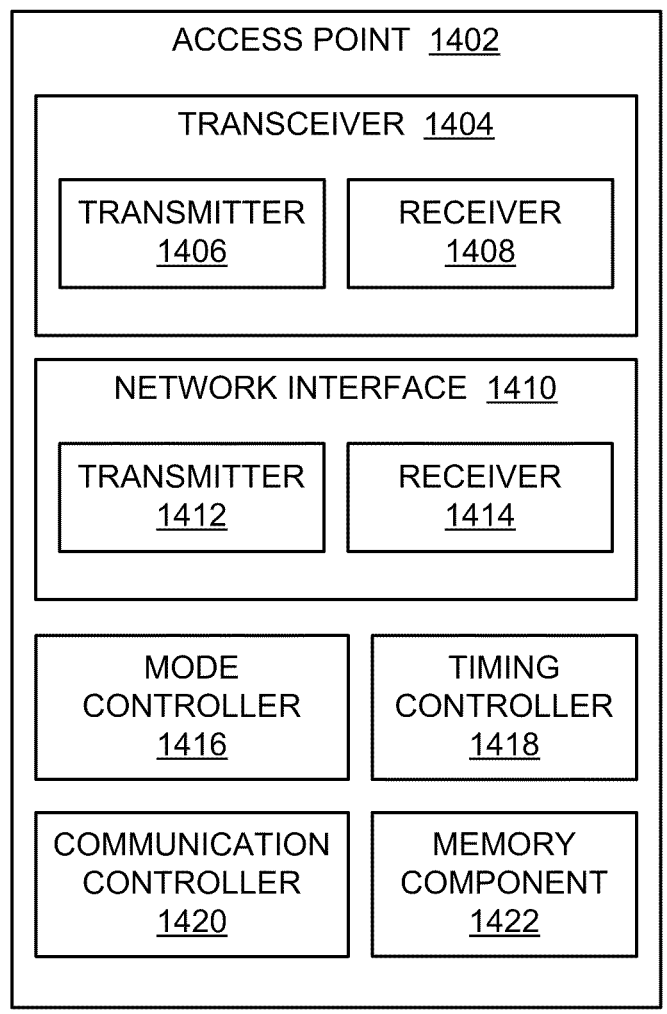
FIG. 14 is a simplified block diagram of several sample aspects of components that may be employed in communication nodes.

FIG. 14 illustrates several sample components (represented by corresponding blocks) that may be incorporated into nodes such as an access point 1402 (e.g., corresponding to the access point 104 of FIG. 1) to perform timing control-related operations as taught herein. The described components also may be incorporated into other nodes in a communication system. For example, other nodes in a system may include components similar to those described for the access point 1402 to provide similar functionality. Also, a given node may contain one or more of the described components. For example, an access point may contain multiple transceiver components that enable the access point to operate on multiple carriers and/or communicate via different technologies.

As shown in FIG. 14, the access point 1402 includes a transceiver 1404 for communicating with other nodes (e.g., access terminals). The transceiver 1404 includes a transmitter 1406 for sending signals (e.g., pilot signals, frames, messages, requests) and a receiver 1408 for receiving signals (e.g., messages, responses, timing information).

The access point 1402 also includes a network interface 1410 for communicating with other nodes (e.g., network entities). For example, the network interface 1410 may be configured to communicate with one or more network entities via a wire-based or wireless backhaul. In some aspects, the network interface 1410 may be implemented as a transceiver (e.g., including transmitter and receiver components) configured to support wire-based or wireless communication. Accordingly, in the example of FIG. 14, the network interface 1410 is shown as including a transmitter 1412 and a receiver 1414.

The access point 1402 includes other components that may be used in conjunction with timing control-related operations as taught herein. For example, the access point 1402 includes a mode controller 1416 (e.g., corresponding to the component 122 of FIG. 1) for detecting a mode of operation of the access point 1402 and/or of nearby access terminals (e.g., determining that an access point is handing an active call, determining that an access terminal is in idle mode) and for providing other related functionality as taught herein. In some implementations, some of the functionality of the mode controller 1416 may be implemented in the transceiver 1404. The access point 1402 also includes a timing controller 1418 (e.g., corresponding to the component 124 of FIG. 1) for controlling timing at the access point 1402 (e.g., acquiring timing information, adjusting a clock, estimating the reliability of a clock, determining a rate at which timing information should be provided, acquiring other timing information, determining that an access point has sufficiently accurate timing, electing to use timing information, acquiring timing information associated with at least one other timing source, determining reliability of a timing source, weighting timing information) and for providing other related functionality as taught herein. In addition, the access point 1402 includes a communication controller 1420 for facilitating communications by the access point 1402 (e.g., sending at least one request, sending a message, receiving a message, receiving a response) and for providing other related functionality as taught herein. In some implementations, some of the functionality of the communication controller 1420 may be implemented in the transceiver 1404 and/or the network interface 1410. Also, the access point 1402 includes a memory component 1422 (e.g., including a memory device) for maintaining information (e.g., timing information, timing source search information, report information, and so on).

For convenience, the access point 1402 is shown in FIG. 14 as including components that may be used in the various examples described herein. In practice, the functionality of one or more of these blocks may be different in different embodiments. For example, the functionality of block 1416 may be different in an embodiment implemented in accordance with FIG. 2 as compared to an embodiment implemented in accordance with FIG. 3.

The components of FIG. 14 may be implemented in various ways. In some implementations the components of FIG. 14 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by blocks 1404 and 1410, and some or all of the functionality represented by blocks 1416-1422 may be implemented by a processor or processors of an access point and data memory of the access point (e.g., by execution of appropriate code and/or by appropriate configuration of processor components).

As discussed above, the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 15:
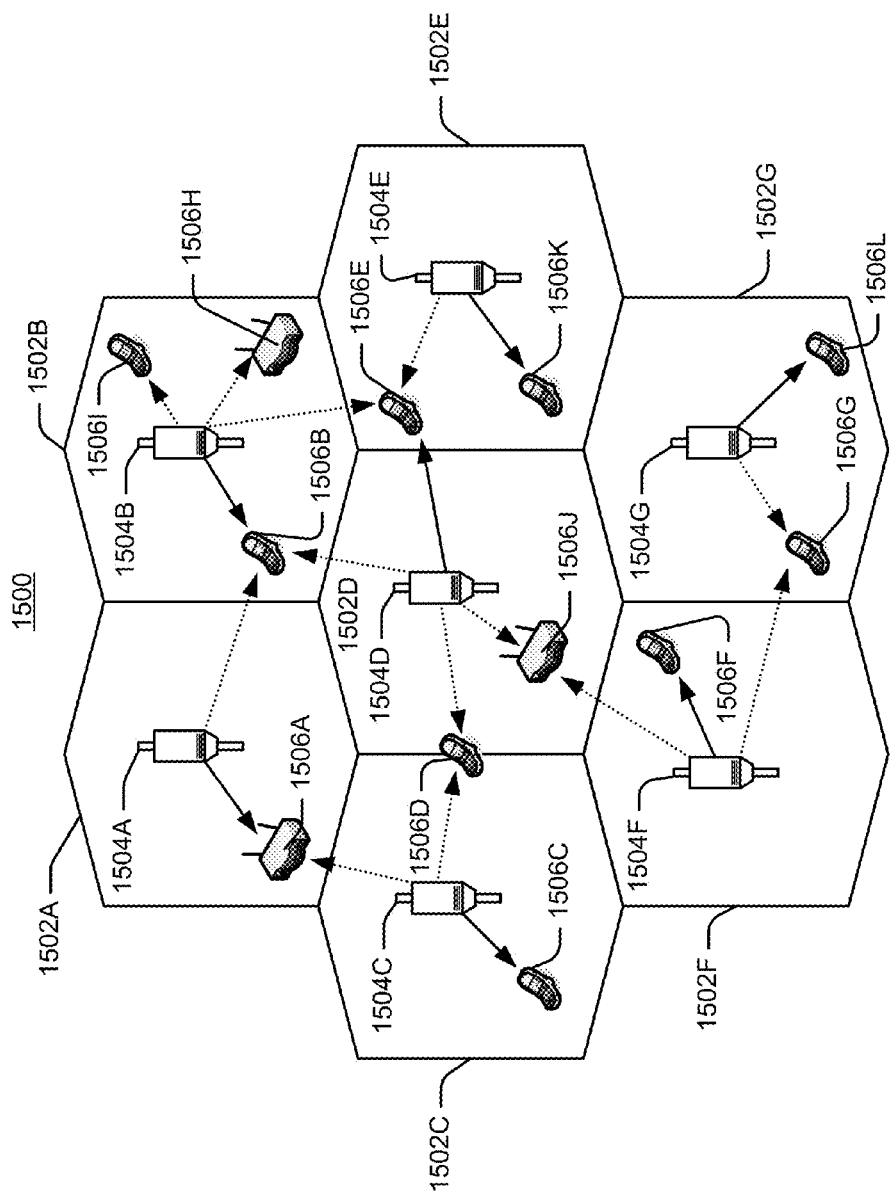
FIG. 15 is a simplified diagram of a wireless communication system.

FIG. 15 illustrates a wireless communication system 1500, configured to support a number of users, in which the teachings herein may be implemented. The system 1500 provides communication for multiple cells 1502, such as, for example, macro cells 1502A-1502G, with each cell being serviced by a corresponding access point 1504 (e.g., access points 1504A-1504G). As shown in FIG. 15, access terminals 1506 (e.g., access terminals 1506A-1506L) may be dispersed at various locations throughout the system over time. Each access terminal 1506 may communicate with one or more access points 1504 on a forward link (FL) and/or a reverse link (RL) at a given moment, depending upon whether the access terminal 1506 is active and whether it is in soft handoff, for example. The wireless communication system 1500 may provide service over a large geographic region. For example, macro cells 1502A-1502G may cover a few blocks in a neighborhood or several miles in a rural environment.

Figure 16:
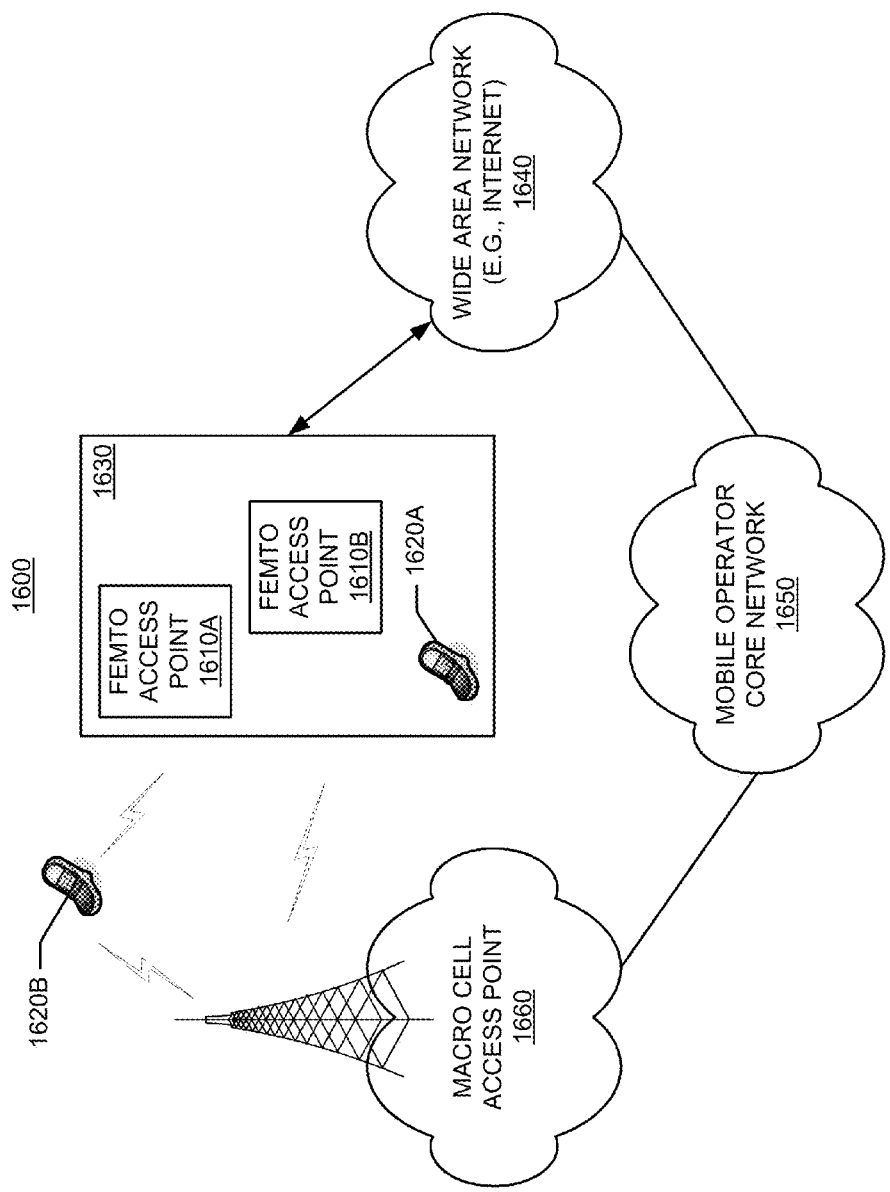
FIG. 16 is a simplified diagram of a wireless communication system including femto nodes.

FIG. 16 illustrates an exemplary communication system 1600 where one or more femto access points are deployed within a network environment. Specifically, the system 1600 includes multiple femto access points 1610 (e.g., femto access points 1610A and 1610B) installed in a relatively small scale network environment (e.g., in one or more user residences 1630). Each femto access point 1610 may be coupled to a wide area network 1640 (e.g., the Internet) and a mobile operator core network 1650 via a DSL router, a cable modem, a wireless link, or other connectivity means (not shown). As will be discussed below, each femto access point 1610 may be configured to serve associated access terminals 1620 (e.g., access terminal 1620A) and, optionally, other (e.g., hybrid or alien) access terminals 1620 (e.g., access terminal 1620B). In other words, access to femto access points 1610 may be restricted whereby a given access terminal 1620 may be served by a set of designated (e.g., home) femto access point(s) 1610 but may not be served by any non-designated femto access points 1610 (e.g., a neighbor's femto access point 1610).

Figure 17:
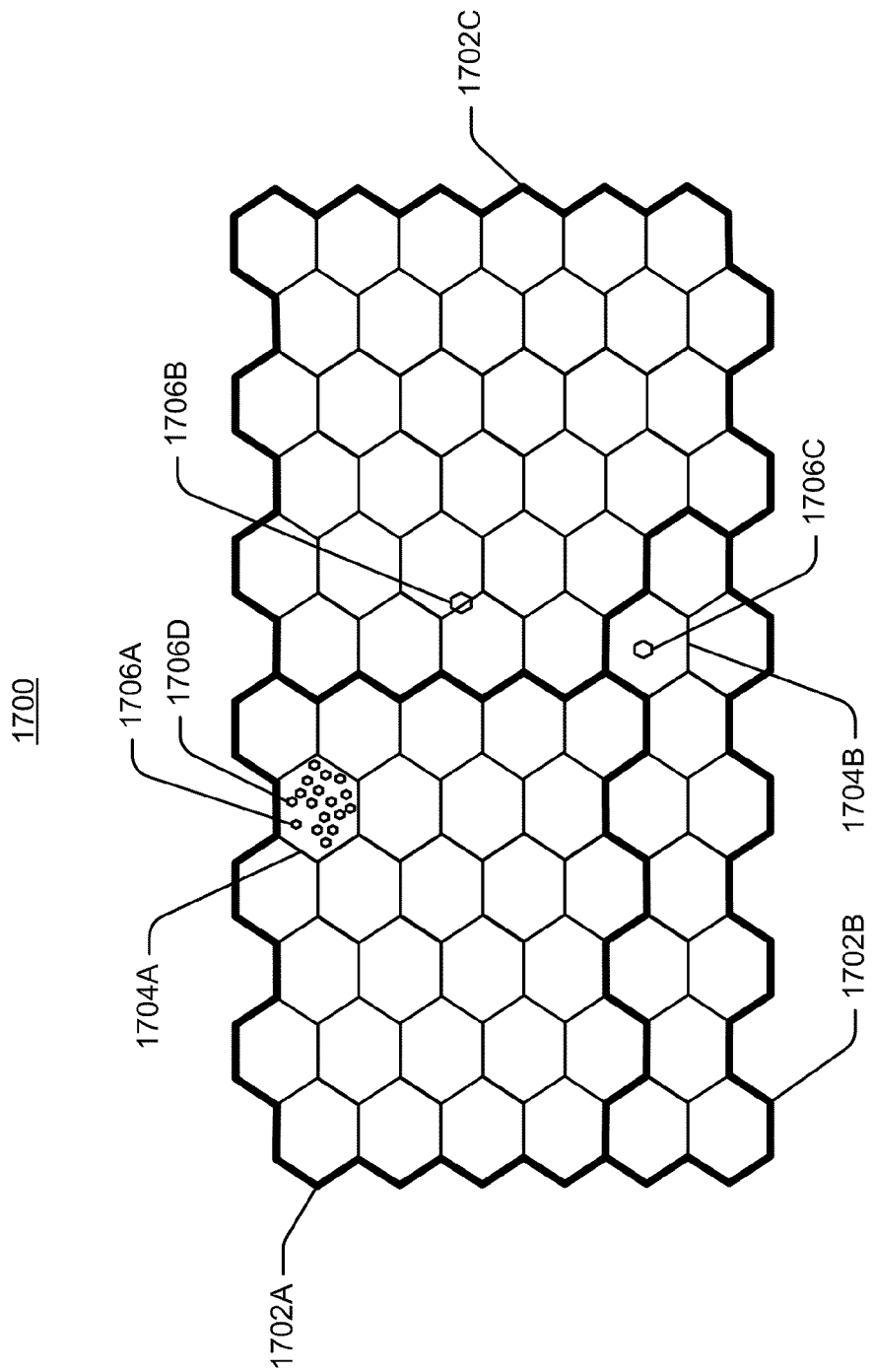
FIG. 17 is a simplified diagram illustrating coverage areas for wireless communication.

FIG. 17 illustrates an example of a coverage map 1700 where several tracking areas 1702 (or routing areas or location areas) are defined, each of which includes several macro coverage areas 1704. Here, areas of coverage associated with tracking areas 1702A, 1702B, and 1702C are delineated by the wide lines and the macro coverage areas 1704 are represented by the larger hexagons. The tracking areas 1702 also include femto coverage areas 1706. In this example, each of the femto coverage areas 1706 (e.g., femto coverage areas 1706B and 1706C) is depicted within one or more macro coverage areas 1704 (e.g., macro coverage areas 1704A and 1704B). It should be appreciated, however, that some or all of a femto coverage area 1706 may not lie within a macro coverage area 1704. In practice, a large number of femto coverage areas 1706 (e.g., femto coverage areas 1706A and 1706D) may be defined within a given tracking area 1702 or macro coverage area 1704. Also, one or more pico coverage areas (not shown) may be defined within a given tracking area 1702 or macro coverage area 1704.

Referring again to FIG. 16, the owner of a femto access point 1610 may subscribe to mobile service, such as, for example, 3G mobile service, offered through the mobile operator core network 1650. In addition, an access terminal 1620 may be capable of operating both in macro environments and in smaller scale (e.g., residential) network environments. In other words, depending on the current location of the access terminal 1620, the access terminal 1620 may be served by a macro cell access point 1660 associated with the mobile operator core network 1650 or by any one of a set of femto access points 1610 (e.g., the femto access points 1610A and 1610B that reside within a corresponding user residence 1630). For example, when a subscriber is outside his home, he is served by a standard macro access point (e.g., access point 1660) and when the subscriber is at home, he is served by a femto access point (e.g., access point 1610A). Here, a femto access point 1610 may be backward compatible with legacy access terminals 1620.

A femto access point 1610 may be deployed on a single frequency or, in the alternative, on multiple frequencies. Depending on the particular configuration, the single frequency or one or more of the multiple frequencies may overlap with one or more frequencies used by a macro access point (e.g., access point 1660).

In some aspects, an access terminal 1620 may be configured to connect to a preferred femto access point (e.g., the home femto access point of the access terminal 1620) whenever such connectivity is possible. For example, whenever the access terminal 1620A is within the user's residence 1630, it may be desired that the access terminal 1620A communicate only with the home femto access point 1610A or 1610B.

In some aspects, if the access terminal 1620 operates within the macro cellular network 1650 but is not residing on its most preferred network (e.g., as defined in a preferred roaming list), the access terminal 1620 may continue to search for the most preferred network (e.g., the preferred femto access point 1610) using a better system reselection (BSR) procedure, which may involve a periodic scanning of available systems to determine whether better systems are currently available and subsequently acquire such preferred systems. The access terminal 1620 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1610, the access terminal 1620 selects the femto access point 1610 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1610 that reside within the corresponding user residence 1630). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 18:
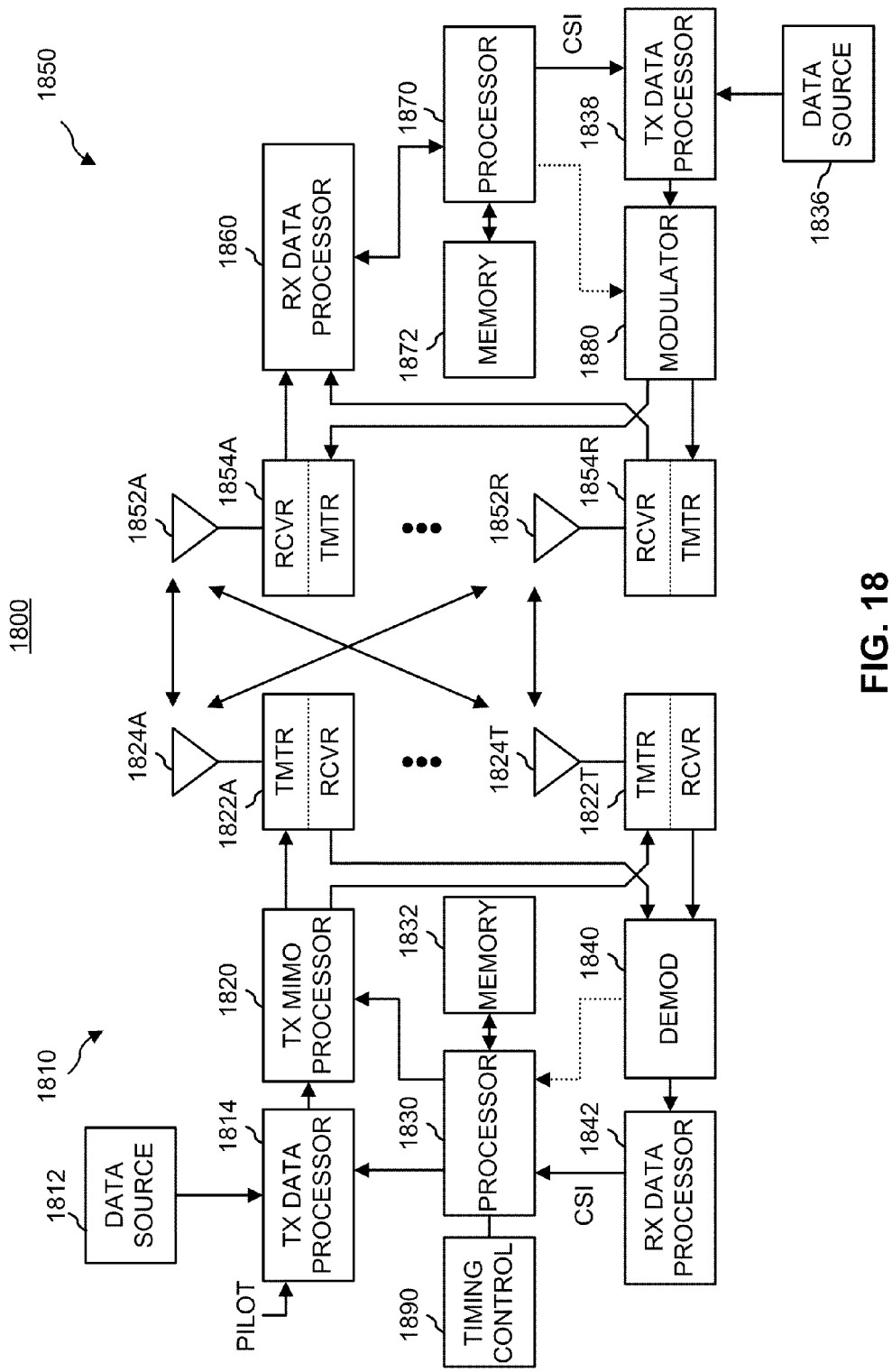
FIG. 18 is a simplified block diagram of several sample aspects of communication components.

FIG. 18 illustrates a wireless device 1810 (e.g., an access point) and a wireless device 1850 (e.g., an access terminal) of a sample MIMO system 1800. At the device 1810, traffic data for a number of data streams is provided from a data source 1812 to a transmit (TX) data processor 1814. Each data stream may then be transmitted over a respective transmit antenna.

The TX data processor 1814 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1830. A data memory 1832 may store program code, data, and other information used by the processor 1830 or other components of the device 1810.

The modulation symbols for all data streams are then provided to a TX MIMO processor 1820, which may further process the modulation symbols (e.g., for OFDM). The TX MIMO processor 1820 then provides $N_T$ modulation symbol streams to $N_T$ transceivers (XCVR) 1822A through 1822T. In some aspects, the TX MIMO processor 1820 applies beam-forming weights to the symbols of the data streams and to the antenna from which the symbol is being transmitted.

Each transceiver 1822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1822A through 1822T are then transmitted from $N_T$ antennas 1824A through 1824T, respectively.

At the device 1850, the transmitted modulated signals are received by $N_R$ antennas 1852A through 1852R and the received signal from each antenna 1852 is provided to a respective transceiver (XCVR) 1854A through 1854R. Each transceiver 1854 conditions (e.g., filters, amplifies, and downconverts) a respective received signal, digitizes the conditioned signal to provide samples, and further processes the samples to provide a corresponding "received" symbol stream.

A receive (RX) data processor 1860 then receives and processes the $N_R$ received symbol streams from $N_R$ transceivers 1854 based on a particular receiver processing technique to provide $N_T$ "detected" symbol streams. The RX data processor 1860 then demodulates, deinterleaves, and decodes each detected symbol stream to recover the traffic data for the data stream. The processing by the RX data processor 1860 is complementary to that performed by the TX MIMO processor 1820 and the TX data processor 1814 at the device 1810.

A processor 1870 periodically determines which pre-coding matrix to use (discussed below). The processor 1870 formulates a reverse link message comprising a matrix index portion and a rank value portion. A data memory 1872 may store program code, data, and other information used by the processor 1870 or other components of the device 1850.

The reverse link message may comprise various types of information regarding the communication link and/or the received data stream. The reverse link message is then processed by a TX data processor 1838, which also receives traffic data for a number of data streams from a data source 1836, modulated by a modulator 1880, conditioned by the transceivers 1854A through 1854R, and transmitted back to the device 1810.

At the device 1810, the modulated signals from the device 1850 are received by the antennas 1824, conditioned by the transceivers 1822, demodulated by a demodulator (DEMOD) 1840, and processed by a RX data processor 1842 to extract the reverse link message transmitted by the device 1850. The processor 1830 then determines which pre-coding matrix to use for determining the beam-forming weights then processes the extracted message.

FIG. 18 also illustrates that the communication components may include one or more components that perform timing control operations as taught herein. For example, a timing control component 1890 may cooperate with the processor 1830 and/or other components of the device 1810 to adjust a clock that may be used for sending/receiving signals to/from another device (e.g., device 1850) as taught herein. It should be appreciated that for each device 1810 and 1850 the functionality of two or more of the described components may be provided by a single component. For example, a single processing component may provide the functionality of the timing control component 1890 and the processor 1830.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7, etc.) technology, as well as 3GPP2 (e.g., 1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 19:
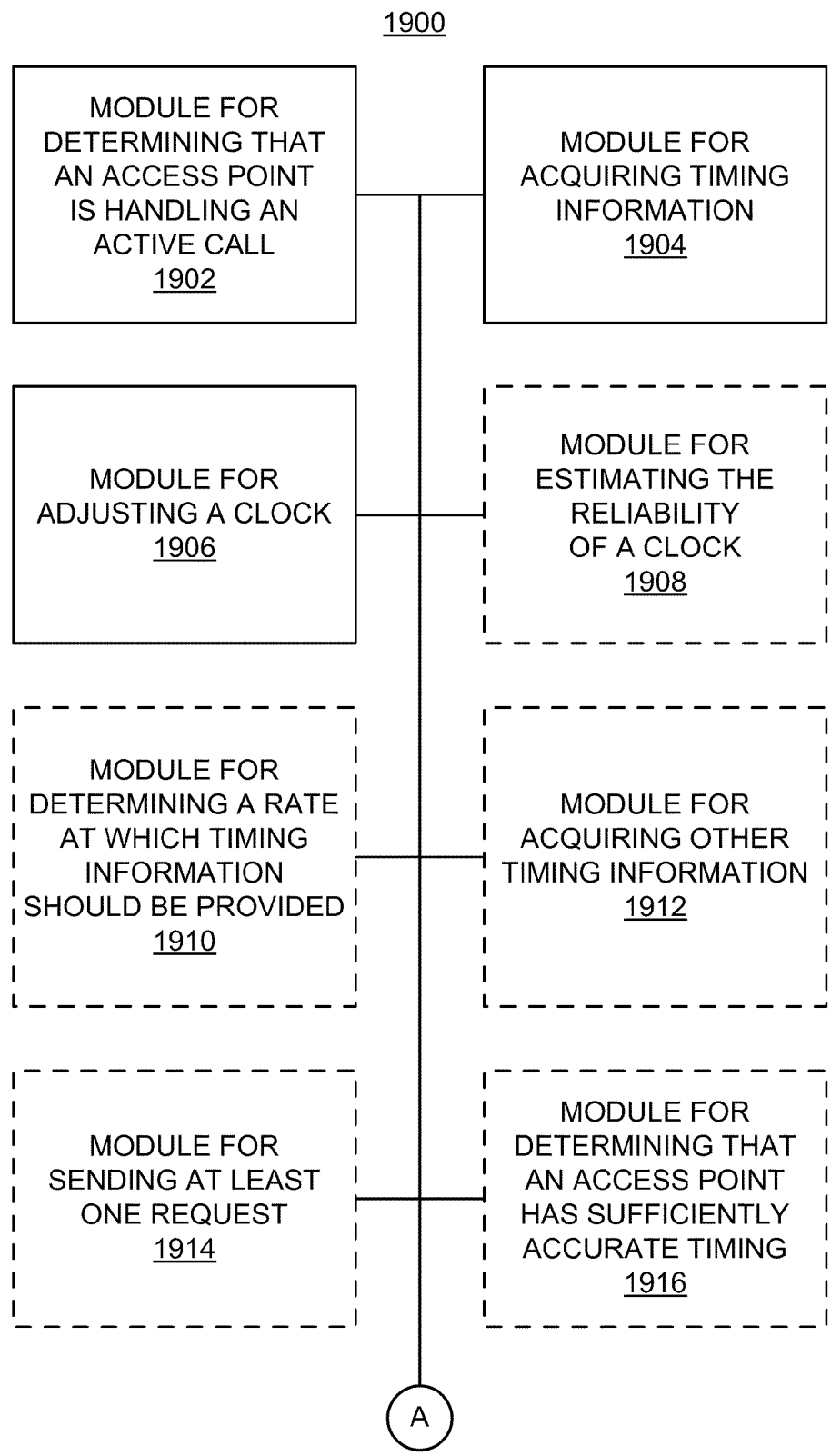
FIGS. 19-21 are simplified block diagrams of several sample aspects of apparatuses configured to provide time tracking and/or frequency tracking as taught herein.
Figure 20:
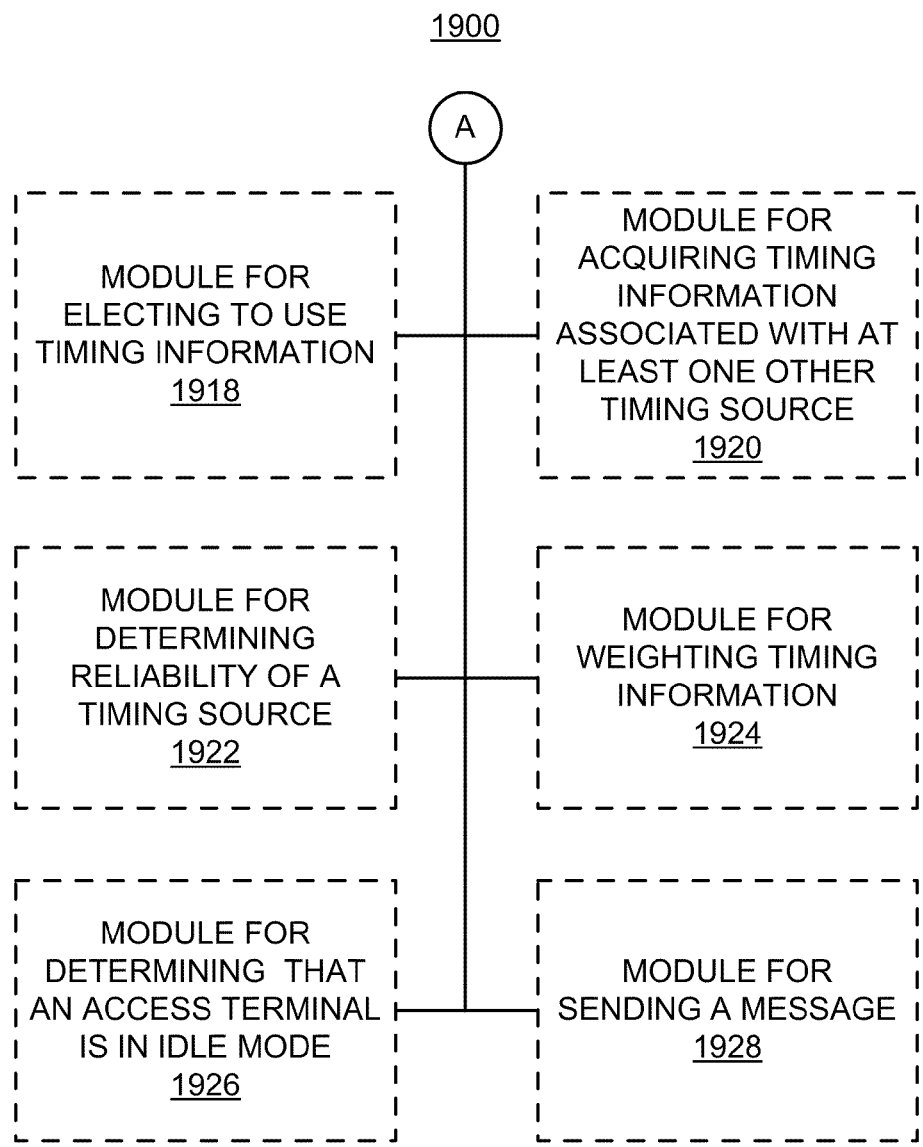
Figure 21:
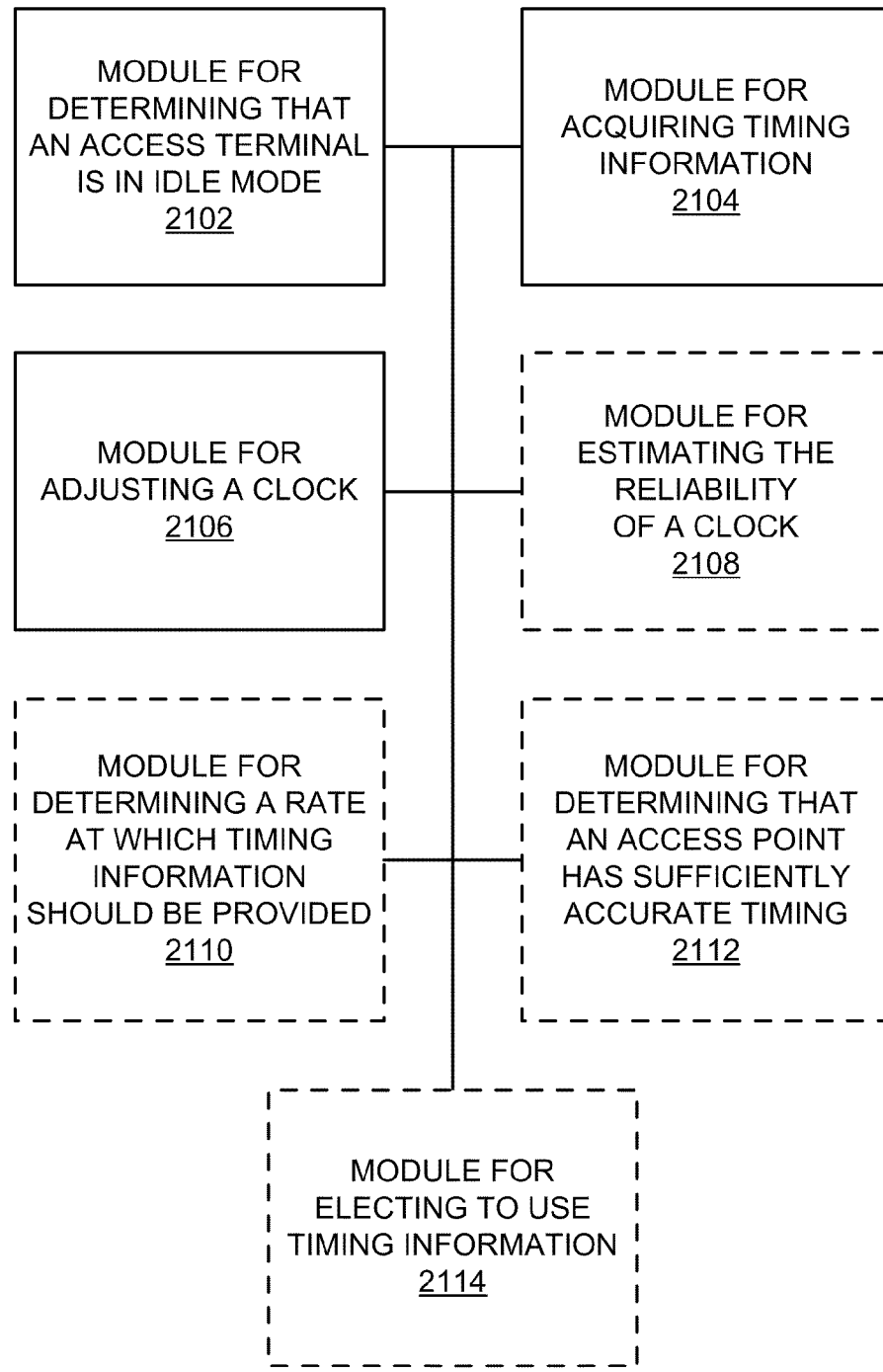

The functionality described herein (e.g., with regard to one or more of the accompanying figures) may correspond in some aspects to similarly designated "means for" functionality in the appended claims. Referring to FIGS. 19-21, apparatuses 1900 and 2100 are represented as a series of interrelated functional modules. Here, a module for determining that an access point is handing an active call 1902 may correspond at least in some aspects to, for example, a mode controller as discussed herein. A module for acquiring timing information 1904 may correspond at least in some aspects to, for example, a timing controller as discussed herein. A module for adjusting a clock 1906 may correspond at least in some aspects to, for example, a timing controller as discussed herein. A module for estimating the reliability of a clock 1908 may correspond at least in some aspects to, for example, a timing controller as discussed herein. A module for determining a rate at which timing information should be provided 1910 may correspond at least in some aspects to, for example, a timing controller as discussed herein. A module for acquiring other timing information 1912 may correspond at least in some aspects to, for example, a timing controller as discussed herein. A module for sending at least one request 1914 may correspond at least in some aspects to, for example, a communication controller as discussed herein. A module for determining that an access point has sufficiently accurate timing 1916 may correspond at least in some aspects to, for example, a timing controller as discussed herein. A module for electing to use timing information 1918 may correspond at least in some aspects to, for example, a timing controller as discussed herein. A module for acquiring timing information associated with at least one other timing source 1920 may correspond at least in some aspects to, for example, a timing controller as discussed herein. A module for determining reliability of a timing source 1922 may correspond at least in some aspects to, for example, a timing controller as discussed herein. A module for weighting timing information 1924 may correspond at least in some aspects to, for example, a timing controller as discussed herein. A module for determining that an access terminal is in idle mode 1926 may correspond at least in some aspects to, for example, a mode controller as discussed herein. A module for sending a message 1928 may correspond at least in some aspects to, for example, a communication controller as discussed herein. A module for determining that an access terminal is in idle mode 2102 may correspond at least in some aspects to, for example, a timing controller as discussed herein. A module for acquiring timing information 2104 may correspond at least in some aspects to, for example, a timing controller as discussed herein. A module for adjusting a clock 2106 may correspond at least in some aspects to, for example, a timing controller as discussed herein. A module for estimating the reliability of a clock 2108 may correspond at least in some aspects to, for example, a timing controller as discussed herein. A module for determining a rate at which timing information should be provided 2110 may correspond at least in some aspects to, for example, a timing controller as discussed herein. A module for determining that an access point has sufficiently accurate timing 2112 may correspond at least in some aspects to, for example, a timing controller as discussed herein. A module for electing to use timing information 2114 may correspond at least in some aspects to, for example, a timing controller as discussed herein.

The functionality of the modules of FIGS. 19-21 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 19-21 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
    determining, at a femto cell access point, that the femto cell access point is communicating with an access terminal via an active call over a dedicated channel between the femto cell access point and the access terminal;
    acquiring, at the femto cell access point, timing information from the access terminal during the communication as a result of the determining that the femto cell access point is communicating over the dedicated channel; and
    adjusting, at the femto cell access point, a clock that controls transmissions by the femto cell access point, wherein the adjusting of the clock is based on the acquired timing information.

2. The method of claim 1, wherein the timing information is indicative of a difference between timing associated with the femto cell access point and timing associated with at least one other cell.

3. The method of claim 1, wherein the adjusting of the clock comprises adjusting a phase of a signal transmitted by the femto cell access point so that the adjusted phase is synchronized with a phase of transmission of at least one other access point or with a phase of a timing source.

4. The method of claim 1, wherein the adjusting of the clock comprises adjusting a frequency of a signal transmitted by the femto cell access point so that the adjusted frequency is synchronized with a transmit frequency of at least one other access point or is matched to a frequency specified by network operation requirements.

5. The method of claim 1, wherein:
    the timing information is indicative of timing of another access point or a timing source, which drives timing of an event at the access terminal; and
    the adjusting of the clock comprises adjusting timing of a signal transmission by the femto cell access point so that the adjusted timing is synchronized with the timing of the event.

6. The method of claim 1, wherein the timing information is indicative of a phase difference between a first pilot signal received by the access terminal from the femto cell access point and a second pilot signal received by the access terminal from another access point.

7. The method of claim 1, wherein the acquiring of the timing information comprises receiving a pilot strength measurement message from the access terminal, receiving a candidate frequency search report from the access terminal, receiving a measurement report message from the access terminal, or receiving a route update message from the access terminal.

8. The method of claim 1, wherein the timing information is indicative of a timing difference between a time at which a frame from the femto cell access point is received by the access terminal and a time at which a frame from another access point is received by the access terminal.

9. The method of claim 8, wherein the acquiring of the timing information comprises receiving an observed time difference report from the access terminal.

10. The method of claim 1, wherein the acquiring of the timing information comprises sending a request to the access terminal for the timing information as a result of the determining that the femto cell access point is communicating over the dedicated channel.

11. The method of claim 10, wherein the acquiring of the timing information further comprises receiving a message including the timing information from the access terminal.

12. The method of claim 10, wherein the request for the timing information includes a list that is indicative of at least one pilot signal for which the access terminal is to search to provide the timing information.

13. The method of claim 10, wherein the request for the timing information comprises a request for the access terminal to repeatedly provide timing information reports.

14. The method of claim 13, wherein:
    the timing information reports are indicative of a plurality of timing differences between the femto cell access point and another access point over a period of time;
    the adjusting of the clock comprises determining a rate of change of the timing differences;
    the adjusting of the clock further comprises determining a frequency adjustment based on the rate of change of the timing differences; and
    the adjusting of the clock further comprises adjusting a frequency of the clock based on the frequency adjustment.

15. The method of claim 10, further comprising:
    estimating a reliability of the clock; and
    determining a rate at which the timing information should be provided by the access terminal based on the estimated reliability,
    wherein the request for the timing information comprises a request for the access terminal to provide the timing information at the determined rate.

16. The method of claim 10, wherein the request for the timing information comprises a request for the access terminal to search for signals on at least one specified carrier frequency.

17. The method of claim 10, wherein the request for the timing information comprises a request for the access terminal to search for signals from a plurality of other access points.

18. The method of claim 17, wherein:
the timing information is indicative of a plurality of timing differences between the femto cell access point and at least a portion of the other access points; and
the adjusting of the clock is based on the plurality of timing differences.

19. The method of claim 10, further comprising acquiring other timing information from at least one other access terminal, wherein the adjusting of the clock is further based on the other timing information.

20. The method of claim 19, wherein the timing information acquired from the access terminal is associated with a type of radio technology and the other timing information acquired from the at least one other access terminal is associated with at least one other type of radio technology.

21. The method of claim 19, further comprising sending at least one request to the at least one other access terminal to provide the other timing information.

22. The method of claim 1, wherein the timing information is indicative of a timing difference between the femto cell access point and another access point, the method further comprising:
determining that the other access point has sufficiently accurate timing; and
electing to use the timing information received from the access terminal for the adjusting of the clock as a result of the determining that the other access point has sufficiently accurate timing.

23. The method of claim 1, wherein the timing information acquired from the access terminal is associated with a first timing source, the method further comprising:
acquiring timing information associated with at least one other timing source;
for each timing source, determining a reliability of the timing source; and
for each timing source, weighting the timing information associated with the timing source based on the determined reliability of the timing source,
wherein the adjusting of the clock is based on the weighted timing information.

24. The method of claim 1, further comprising determining that the access terminal is in idle mode, wherein the timing information is acquired from the access terminal as a result of the determining that the access terminal is in idle mode.

25. The method of claim 24, wherein the determining that the access terminal is in idle mode comprises requesting the access terminal to register with the femto cell access point or requesting the access terminal to respond to a control channel message from the femto cell access point.

26. The method of claim 24, wherein the acquiring of the timing information comprises sending a message that requests the access terminal to send the timing information to the femto cell access point.

27. The method of claim 24, wherein the acquiring of the timing information comprises receiving a message including the timing information from the access terminal.

28. The method of claim 27, wherein the message comprises a radio environment report message or a route update message.

29. The method of claim 1, wherein the timing information is indicative of a difference between timing associated with the femto cell access point and timing associated with a macro cell access point.

30. An apparatus for communication, comprising:
a mode controller configured to determine, at a femto cell access point, that the femto cell access point is communicating with an access terminal via an active call over a dedicated channel between the femto cell access point and the access terminal; and
a timing controller configured to acquire, at the femto cell access point, timing information from the access terminal during the communication as a result of the determining that the femto cell access point is communicating over the dedicated channel, and further configured to adjust, at the femto cell access point, a clock that controls transmissions by the femto cell access point, wherein the adjusting of the clock is based on the acquired timing information.

31. The apparatus of claim 30, wherein the timing information is indicative of a difference between timing associated with the femto cell access point and timing associated with at least one other cell.

32. The apparatus of claim 30, wherein the timing controller is configured to adjust the clock by adjusting a phase of a signal transmitted by the femto cell access point so that the adjusted phase is synchronized with a phase of transmission of at least one other access point or with a phase of a timing source.

33. The apparatus of claim 30, wherein the timing controller is configured to adjust the clock by adjusting a frequency of a signal transmitted by the femto cell access point so that the adjusted frequency is synchronized with a transmit frequency of at least one other access point or is matched to a frequency specified by network operation requirements.

34. The apparatus of claim 30, wherein the timing information is indicative of a phase difference between a first pilot signal received by the access terminal from the femto cell access point and a second pilot signal received by the access terminal from another access point.

35. The apparatus of claim 30, wherein the timing information is indicative of a timing difference between a time at which a frame from the femto cell access point is received by the access terminal and a time at which a frame from another access point is received by the access terminal.

36. The apparatus of claim 30, wherein the timing controller is configured to acquire the timing information by sending a request to the access terminal for the timing information as a result of the determining that the femto cell access point is communicating over the dedicated channel.

37. The apparatus of claim 36, wherein:
the timing controller is further configured to estimate a reliability of the clock;
the timing controller is further configured to determine a rate at which the timing information should be provided by the access terminal based on the estimated reliability; and
the request for the timing information comprises a request for the access terminal to provide the timing information at the determined rate.

38. The apparatus of claim 30, wherein:
the timing information is indicative of a timing difference between the femto cell access point and another access point;
the timing controller is further configured to determine that the other access point has sufficiently accurate timing; and
the timing controller is further configured to elect to use the timing information received from the access terminal for the adjusting of the clock as a result of the determining that the other access point has sufficiently accurate timing.

39. The apparatus of claim 30, wherein:
the mode controller is further configured to determine that the access terminal is in idle mode; and
the timing information is acquired from the access terminal as a result of the determining that the access terminal is in idle mode.

40. An apparatus for communication, comprising:
means for determining, at a femto cell access point, that the femto cell access point is communicating with an access terminal via an active call over a dedicated channel;
means for acquiring, at the femto cell access point, timing information from the access terminal during the communication as a result of the determining that the femto cell access point is communicating over the dedicated channel between the femto cell access point and the access terminal; and
means for adjusting, at the femto cell access point, a clock that controls transmissions by the femto cell access point, wherein the adjusting of the clock is based on the acquired timing information.

41. The apparatus of claim 40, wherein the timing information is indicative of a difference between timing associated with the femto cell access point and timing associated with at least one other cell.

42. The apparatus of claim 40, wherein the means for adjusting the clock comprises means for adjusting a phase of a signal transmitted by the femto cell access point so that the adjusted phase is synchronized with a phase of transmission of at least one other access point or with a phase of a timing source.

43. The apparatus of claim 40, wherein the means for adjusting the clock comprises means for adjusting a frequency of a signal transmitted by the femto cell access point so that the adjusted frequency is synchronized with a transmit frequency of at least one other access point or is matched to a frequency specified by network operation requirements.

44. The apparatus of claim 40, wherein the timing information is indicative of a phase difference between a first pilot signal received by the access terminal from the femto cell access point and a second pilot signal received by the access terminal from another access point.

45. The apparatus of claim 40, wherein the timing information is indicative of a timing difference between a time at which a frame from the femto cell access point is received by the access terminal and a time at which a frame from another access point is received by the access terminal.

46. The apparatus of claim 40, wherein the means for acquiring the timing information comprises means for sending a request to the access terminal for the timing information as a result of the determining that the femto cell access point is communicating over the dedicated channel.

47. The apparatus of claim 46, further comprising:
means for estimating a reliability of the clock; and
means for determining a rate at which the timing information should be provided by the access terminal based on the estimated reliability,
wherein the request for the timing information comprises a request for the access terminal to provide the timing information at the determined rate.

48. The apparatus of claim 40, wherein the timing information is indicative of a timing difference between the femto cell access point and another access point, the apparatus further comprising:
means for determining that the other access point has sufficiently accurate timing; and
means for electing to use the timing information received from the access terminal for the adjusting of the clock as a result of the determining that the other access point has sufficiently accurate timing.

49. The apparatus of claim 40, further comprising means for determining that the access terminal is in idle mode, wherein the timing information is acquired from the access terminal as a result of the determining that the access terminal is in idle mode.

50. A non-transitory computer-readable medium comprising code for causing a computer to:
determine, at a femto cell access point, that the femto cell access point is communicating with an access terminal via an active call over a dedicated channel;
acquire, at the femto cell access point, timing information from the terminal during the communication as a result of the determining that the femto cell access point is communicating over the dedicated channel between the femto cell access point and the access terminal; and
adjust, at the femto cell access point, a clock that controls transmissions by the femto cell access point, wherein the adjusting of the clock is based on the acquired timing information.

51. The non-transitory computer-readable medium of claim 50, wherein the timing information is indicative of a difference between timing associated with the femto cell access point and timing associated with at least one other cell.

52. The non-transitory computer-readable medium of claim 50, wherein the adjusting of the clock comprises adjusting a phase of a signal transmitted by the femto cell access point so that the adjusted phase is synchronized with a phase of transmission of at least one other access point or with a phase of a timing source.

53. The non-transitory computer-readable medium of claim 50, wherein the adjusting of the clock comprises adjusting a frequency of a signal transmitted by the femto cell access point so that the adjusted frequency is synchronized with a transmit frequency of at least one other access point or is matched to a frequency specified by network operation requirements.

54. The non-transitory computer-readable medium of claim 50, wherein the timing information is indicative of a phase difference between a first pilot signal received by the access terminal from the femto cell access point and a second pilot signal received by the access terminal from another access point.

55. The non-transitory computer-readable medium of claim 50, wherein the timing information is indicative of a timing difference between a time at which a frame from the femto cell access point is received by the access terminal and a time at which a frame from another access point is received by the access terminal.

56. The non-transitory computer-readable medium of claim 50, wherein the acquiring of the timing information comprises sending a request to the access terminal for the timing information as a result of the determining that the femto cell access point is communicating over the dedicated channel.

57. The non-transitory computer-readable medium of claim 56, wherein:
the computer-readable medium further comprises code for causing the computer to estimate a reliability of the clock;
the computer-readable medium further comprises code for causing the computer to determine a rate at which the timing information should be provided by the access terminal based on the estimated reliability; and the request for the timing information comprises a request for the access terminal to provide the timing information at the determined rate.

58. The non-transitory computer-readable medium of claim 50, wherein:
the timing information is indicative of a timing difference between the femto cell access point and another access point;
the computer-readable medium further comprises code for causing the computer to determine that the other access point has sufficiently accurate timing; and
the computer-readable medium further comprises code for causing the computer to elect to use the timing information received from the access terminal for the adjusting of the clock as a result of the determining that the other access point has sufficiently accurate timing.

59. The non-transitory computer-readable medium of claim 50, wherein:
the computer-readable medium further comprises code for causing the computer to determine that the access terminal is in idle mode; and
the timing information is acquired from the access terminal as a result of the determining that the access terminal is in idle mode.

* * * * *